(12) United States Patent
Yeung et al.

(10) Patent No.: US 7,144,840 B2
(45) Date of Patent: Dec. 5, 2006

(54) TIO$_2$ MATERIAL AND THE COATING METHODS THEREOF

(75) Inventors: King Lun Yeung, Kowloon (HK); Nan Yao, Kowloon (HK)

(73) Assignee: Hong Kong University of Science and Technology, Kowloon ( * ) Notice: Subject to any disclaimer, the term of this patent is extended or adjusted under 35 U.S.C. 154(b) by 0 days.

(21) Appl. No.: 10/898,118

(22) Filed: Jul. 22, 2004

(65) Prior Publication Data

US 2006/0019028 A1    Jan. 26, 2006

(51) Int. Cl.
  *B01J 23/00* (2006.01)
  *B01J 31/00* (2006.01)
  *C01G 21/047* (2006.01)
  *C09D 1/00* (2006.01)
  *A62D 3/00* (2006.01)

(52) U.S. Cl. .............. 502/350; 502/150; 423/610; 423/612; 516/78; 516/90; 106/286.4; 106/287.19; 106/436; 106/437; 106/447; 204/157.43; 204/157.51

(58) Field of Classification Search .......... 502/150, 502/350; 423/610–616; 516/78, 90; 106/286.4, 106/287.19, 436, 437, 447; 204/157.43, 204/157.51

See application file for complete search history.

(56) References Cited

U.S. PATENT DOCUMENTS

| | | | |
|---|---|---|---|
| 5,034,508 A * | 7/1991 | Nishizaki et al. ........... 528/408 |
| 5,045,301 A * | 9/1991 | Chopin et al. .............. 423/610 |
| 5,122,491 A * | 6/1992 | Kioka et al. ................ 502/117 |
| 5,961,710 A * | 10/1999 | Linde et al. ................ 106/437 |
| 6,037,289 A | 3/2000 | Chopin et al. |
| 6,110,266 A * | 8/2000 | Gonzalez-Blanco et al. .......... 106/31.65 |
| 6,262,152 B1 * | 7/2001 | Fryd et al. .................... 524/90 |
| 6,287,374 B1 | 9/2001 | Yanagida et al. |
| 6,287,377 B1 * | 9/2001 | Binns et al. ................. 106/499 |
| 6,306,209 B1 * | 10/2001 | Woodworth et al. ........ 106/499 |
| 6,770,257 B1 * | 8/2004 | Imura et al. ................ 423/610 |
| 2003/0230335 A1 * | 12/2003 | Tsukahara ................... 136/252 |
| 2004/0241502 A1 | 12/2004 | Hoon et al. |

FOREIGN PATENT DOCUMENTS

| EP | 0826432 | 3/1998 |
|---|---|---|
| WO | 02/18484 | 3/2002 |

OTHER PUBLICATIONS

Zhang, et al., "New kinetic model for the nanocrystalline anatase-to-rutile transformation revealing rate dependence on number of particles", 1999, American Mineralogist, vol. 84, pp. 528-535.*

Maira et al., Applied Catalysis B: Environmental 29 (2001) 327-336, "Gas-phase photo-oxidation of toluene using nanometer-size TiO2 catalysts", no month.

Maira et al., Journal of Catalysis 192, 185-196 (2000), "Size Effects in Gas-Phase Photo-oxidation of Trichloroethylene Using Nanometer-Sized TiO2 . . . ", no month.

(Continued)

*Primary Examiner*—J. A. Lorengo
*Assistant Examiner*—Patricia L. Hailey
(74) *Attorney, Agent, or Firm*—Fish & Richardson P.C.

(57) ABSTRACT

The present invention relates to a titanium dioxide material for coating on a substrate and method of making the same. The coated material is resistant to delamination and can be used for air-purification purposes.

25 Claims, 13 Drawing Sheets

OTHER PUBLICATIONS

Maira et al., Chemical Engineering Science 58 (2003) 959-962, "Performance of a membrane -catalyst for photocatalytic oxidation of . . . ", no month.

Maira et al., Journal of Catalysis 202, 413-420 (2001), "Fourier Transform Infrared Study of the Performance of Nanostructured TiO2 Particles . . . ", no month.

King et al., Journal of Catalysis 219 (2003) 107-116, "The influence of surface properties on the photocatalytic activity of . . . ", no month.

King et al., J. Phys. Chem. B 2002, 106, 4608-4616, "Ensemble Effects in Nanostructured TiO2 Used in the Gas-Phase Photooxidation of . . . ", no month.

Coronado et al., Langmuir 2001, 17, 5368-5374, "EPR Study of the Surface Characteristics of Nanostructured TiO2 under UV Irradiation", no month.

Yu et al., Langmuir 2000, 16. 7304-7308, "Influence of Thermal Treatment on the Adsorption of Oxygen and Photocatalytic Activity of TiO2", no month.

Yu et al., Journal of Materials Science Letters 20, 2001, 1745-1748, "The grain size and surface hydroxyl content of super-hydrophilic TiO2/SiO2 composite . . . ", no month.

Yu et al., Journal of Sol-Gel Science and Technology, 24 (3): 229-240, Jul. 2002, "Atomic Force Microscopic Studies of Porous TiO2 Thin Films . . . ", no month.

Santen et al., Studies in Surface Science and Catalysis, 123, (1999), 462-465, 10-Preparation of Supported Catalysts, no month.

* cited by examiner

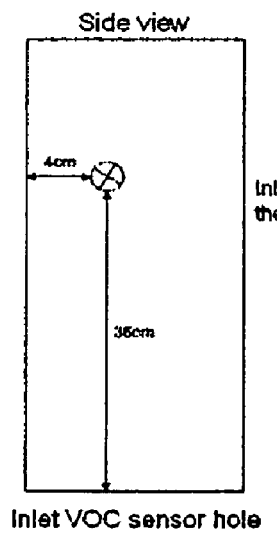 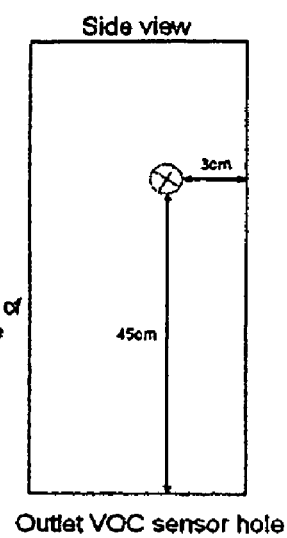
Fig. 20A  Fig. 20B
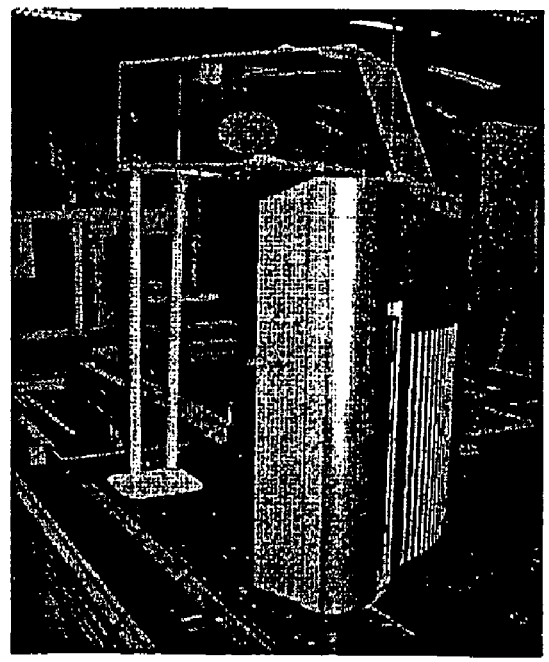
Fig. 21

TIO₂ MATERIAL AND THE COATING METHODS THEREOF

FIELD OF INVENTION

The present invention is related to titanium dioxide crystals, the process of producing it, the use of the titanium dioxide crystals as a photocatalytic coating material, and the method of coating it.

BACKGROUND OF INVENTION

Volatile organic compounds (VOCs) in the air are contaminants and are harmful to human health. Titanium dioxide has been known as an effective photocatalytic material to facilitate photocatalytic oxidization (PCO) of VOCs in air.

However, the photocatalytic activity is not satisfactory. In most instances, titanium dioxide is coated onto a substrate for immobilization to prevent lost and enhance the area exposed to air.

Conventional titanium dioxide coating is prone to scratches and will delaminate over time, resulting in frequent needs for replacements. This is due to the fact that the titanium dioxide coating is often consisted of large aggregated particles with poor adhesion.

It is therefore an object of the present invention to provide an improved photocatalytic material for solving at least one of the above-stated problems.

SUMMARY OF INVENTION

In one aspect, the present invention provides a titanium dioxide material comprising
   a) about 40±10% w/w titanium dioxide crystals having crystal size of 3 nm–25 nm, and the crystallinity of the titanium dioxide is greater than 70%;
   b) about 60±10% w/w dispersant, said dispersant interacting with the titanium dioxide crystals to prevent aggregation thereof such that the crystal size is maintained at about 3–25 nm during the manufacturing process; and
   c) 1–10% w/w water.

In a preferred embodiment, the crystal size of the titanium dioxide crystals ranges between 6–10 nm, and the same size is maintained during the manufacturing process by adding the dispersant. In another preferred embodiment, the titanium dioxide material comprises 1–5% w/w of water.

In still another preferred embodiment, the material further comprises surface hydroxyl groups on the titanium dioxide. About 90–100% of the surface hydroxyl groups are characterized by at least one absorption peak between 3000–3680 $cm^{-1}$ in an infrared spectrum when recorded at 150° C. In the most preferred embodiment, 90–100% of the surface hydroxyl groups are characterized by one absorption peak at about 3660±20 $cm^{-1}$ and another absorption peak at about 3630±20 $cm^{-1}$ in an infrared spectrum when recorded at 150° C.

In yet another preferred embodiment, the surface area of the titanium dioxide is larger than 50 $m^2/g$. In still another preferred embodiment, at least 70% of the titanium dioxide is anatase.

In a further preferred embodiment, the dispersant is a polymer containing OH group or oxygenated function group including hydroxyl, carboxyl and ketone. In a more preferred embodiment, the dispersant is selected from a group consisting of polyoxygenated and polyhydroxylated polymer. In an even more preferred embodiment, the dispersant is polyethylene glycol. In the most preferred embodiment, the dispersant is polyethylene glycol having a molecular weight at 200–1000 g/mole.

In another aspect, the present invention provides a process of producing the titanium dioxide material. The process comprises the following steps:
   a) forming a titanium dioxide sol;
   b) adding a dispersant to said titanium dioxide sol to form a mixture such that the ratio of titanium dioxide: dispersant is about 2:5 to 7:10;
   c) reducing the water content of the mixture to less than 10% w/w.

In a preferred embodiment, the titanium dioxide sol is prepared by hydrolyzing the titanium dioxide precursor preferably in the presence of alcohol and water, and peptizing using nitric acid. The purpose of peptizing is to form a stable sol.

In another preferred embodiment, the ratio of titanium dioxide: dispersant is 3:5.

In still another preferred embodiment, the water content of the mixture is reduced to less than 5% w/w.

The dispersant is added to the titanium dioxide sol for the following functions: (a) controlling the crystal size of the titanium dioxide; (b) preventing the aggregation of titanium dioxide crystals; (c) manipulating the property of surface hydroxyl groups of titanium dioxide; (d) improving the coating performance of the titanium dioxide material. In a preferred embodiment, the dispersant is a polymer containing OH group or oxygenated function group including hydroxyl, carboxyl and ketone. In a more preferred embodiment, the dispersant is selected from a group consisting of polyoxygenated and polyhydroxylated polymer. In the most preferred embodiment, the dispersant is polyethylene glycol. As the desired polymer used at present invention will tend to attach to one another if it is too large, the polyethylene glycol is preferably at a molecular weight at 200–1000 g/mole.

In yet another preferred embodiment, the process of making the titanium dioxide material further comprises microwave treatment after step b) and before step c). In a more preferred embodiment, the microwave treatment lasts about 20 minutes at a power ranging from 30 W to 200 W. Microwave treatment enables rapid crystallization and quenching and facilitates the production of anatase-titanium dioxide with a good crystal size distribution.

In still another aspect, the present invention provides a coating process. The coating process comprises:
   a) applying 1–10 g of the titanium dioxide material onto each square meter of a substrate;
   b) spread the material evenly on the substrate to form a coated substrate; and
   c) calcining the coated substrate.

The coating is highly adhesive to the texture of the substrate and is scratch proof, and does not delaminate over time. In a preferred embodiment, the substrate has a texture surface, including, but not limited to grooved surface, metal, metal oxide, ceramic, glass or polymer.

In yet another aspect, the present invention provides a self-cleaning material. The self-cleaning material comprises a solid surface coated with one to ten monolayers of titanium dioxide. The titanium dioxide coating comprises titanium dioxide crystals having crystal size of about 3–25 nm and crystallinity of 70–100%. In a preferred embodiment, the crystal size of the titanium dioxide crystals remains within the 3–25 nm range for at least one year. In a more preferred embodiment, the crystal size ranges between 6–10 nm and remain within the same range for at least one year.

In another preferred embodiment, the titanium dioxide coating comprises surface hydroxyl groups. About 90–100% of the surface hydroxyl groups are characterized by at least one absorption peak between 3000–3680 cm$^{-1}$ in an infrared spectrum when recorded at 150° C. In the most preferred embodiment, 90–100% of the surface hydroxyl groups are characterized by one absorption peak at about 3660±20 cm$^{-1}$ and another absorption peak at about 3630±20 cm$^{-1}$ in an infrared spectrum when recorded at 150° C.

The OH absorptions under 3680 cm$^{-1}$ in the infrared spectrum when recorded at 150° C. indicates that the hydroxyl groups on the surface of the present titanium dioxide are acidic in nature. The acidic surface hydroxyl groups could facilitate the opening of the ring structures of organic compounds and removal of chlorine, resulting in an enhanced overall catalytic activity for photocatalytic oxidation of aromatic and chlorinated volatile organic compounds.

Using the above method, the crystals size of the titanium dioxide crystals remain within the 3–25 nm range for at least one year. Preferably, the sizes can be controlled at the range of 6 to 10 nm. Because of the high crystallinity of the produced titanium dioxide of the present invention, it can prevent electron-hole recombination in the bulk, also decrease deactivation. Because of the small size of the titanium dioxide, the catalyst has high surface area, thus providing more active sites for reaction. On the other hand, the size of the titanium dioxide crystals of the present invention is preferably not smaller than 3 nm, thus there is no significant blue shift in the band gap energy, so there won't be a need for higher energy UV light to activate the PCO reaction.

BRIEF DESCRIPTION OF THE DRAWINGS

FIG. 20A and 20B are locations of the VOC sensors in the PCO Air Purifier Model 150.

FIG. 21 is a picture of the PCO Air Purifier Model 150 with air channel attached to the exit. Lower and upper spots are the locations of the Bioaerosol Impactors.

DETAILED DESCRIPTION

Definition

Figure 1:
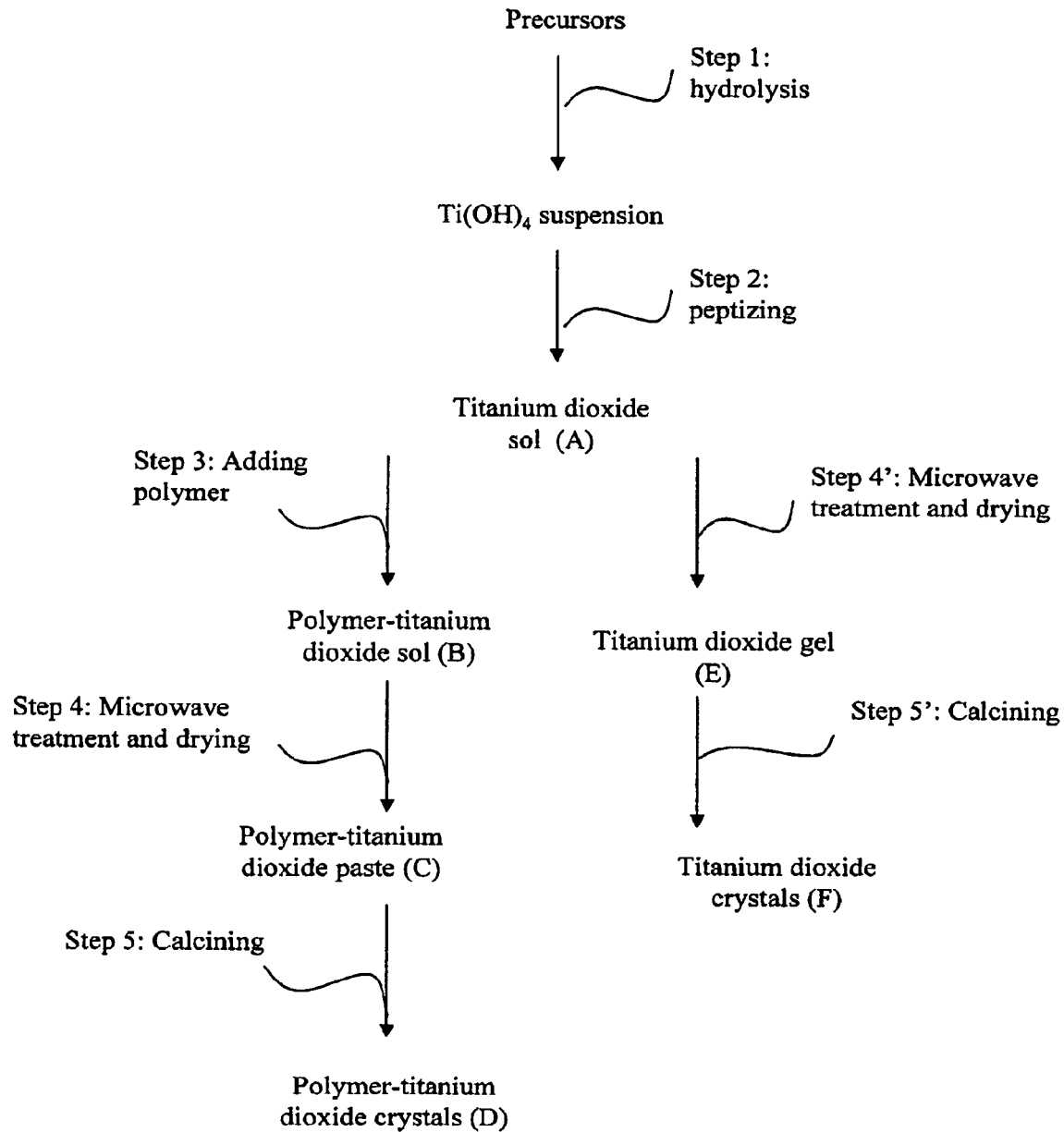
FIG. 1 is a schematic diagram showing the sequential steps of producing titanium dioxide according to one embodiment of the present invention.

The titanium dioxide sol used herein is an amorphous titanium dioxide suspension prepared by hydrolyzing a titanium dioxide precursor in the presence of water and alcohol followed by peptizing it with acid.

Monolayer coating refers to a coating with one layer of particles.

Dispersant refers to an agent that interacts with the titanium dioxide crystals to prevent aggregation of the crystals such that the crystal size is maintained at about 3–25 nm during the manufacturing process. In the preferred embodiment, the dispersant is a polymer containing OH group or oxygenated function group including hydroxyl, carboxyl and ketone. In another preferred embodiment, the dispersant is selected from a group consisting of polyoxygenated and polyhydroxylated polymer.

In accordance with the various aspect of the present invention the titanium dioxide samples may be prepared by a PEG assisted microwave sol-gel method followed by an ultrathin coating process to achieve a coating of 1 to 10 monolayers of titanium dioxide. Using this method and material, a single monolayer coating is achievable. Such coating demonstrates superior performance for photocatalytic oxidation of VOCs.

The following detailed description of the preferred embodiments is divided into four sections: (I) preparation of the titanium dioxide samples; (II) coating methods; (III) characterization methods; and (IV) characterization results of titanium dioxide, coated samples as well as performance testing of titanium dioxide coating.

Section (I) describes how titanium dioxide samples were prepared by sol-gel and crystallized according to the following methods, namely, low temperature crystallization, microwave-assisted crystallization and PEG-moderated, microwave-assisted crystallization.

In section (II), a scratch proof coating method based on brush-coating of polymer-titanium dioxide paste is presented. Other coating methods, including drain-coating, dip-coating using titanium dioxide, polymer-titanium dioxide and commercial P25 powder of different liquid concentrations are also illustrated. (details are given in the examples)

In section (III), the properties of titanium dioxide and coated titanium dioxide prepared by the present invention were characterized by seven methods. X-ray diffraction (XRD) was used to characterize the crystal size and phase structure of titanium dioxide; nitrogen physisorption was used to determine the BET surface area of the titanium dioxide; atomic force microscope (AFM) was used to determine the morphology of the titanium dioxide; FTIR was used to determine the chemical nature of the surface hydroxyl groups on the titanium dioxide. Micro-Raman analysis was used to determine the crystal structure (anatase or rutile, etc.) and the existence of PEG residue of the coated titanium dioxide; scanning electron microscopy (SEM) was used to measure quality of the titanium dioxide coating; X-ray photoelectron spectroscopy (XPS) was used to measure the surface atomic composition of the titanium dioxide coating.

In section (IV), the characterization results were discussed and catalytic activities of the coated titanium dioxide samples were tested by the following two methods: gas-phase photo-catalytic oxidation of isopropanol in a flow reactor was used to test the catalytic reactivity of the titanium dioxide-coated stainless steel plate; a test prototype incorporating the titanium dioxide coated stainless steel was set up to test the performance of the titanium dioxide for germicide and VOC degradation.

Section I. Preparation of the Titanium Dioxide Samples

FIG. 1 is a schematic diagram illustrating the steps for making titanium dioxide samples according to one embodiment of the present invention. Step 1 comprises hydrolysis of a titanium dioxide precursor to form (TiOx(OH)y) X=0–2, Y=4–2X) suspension by adding a solution of precursor (e.g. titanium isopropoxide) and alcohol (e.g. isopropanol) to distilled deionized-water. In step 2, an amount of nitric acid is used to peptize the suspension to produce a stable titanium dioxide sol (A). In step 3, a polymer containing OH group or oxygenated function group including hydroxyl, carboxyl and ketone is added to prepare a polymer-titanium dioxide sol (B). In step 4, (B) was treated by microwave to crystallize and grow the anatase titanium dioxide crystals, followed by removal of liquid moisture to give a polymer-titanium dioxide paste (C). In step 5, (C) was further calcined to remove the polymer and produce polymer-free, anatase titanium dioxide crystals (1)). Subsequent to step 2, a parallel procedure consisting of steps 4' to 5' was developed. In step 4', the titanium dioxide sol (A) produced in step 2 was directly treated by microwave and drying process equal to step 4, but without adding polymers, to yield titanium dioxide gel (E). (E) was further calcined in step 5' to yield titanium dioxide crystals (F).

The following examples illustrate one embodiment of each step mentioned above. For ease of reference, samples corresponding to the products shown in FIG. 1 are given the same alphabetic names.

EXAMPLE 1

Hydrolysis of Titanium Precursor (Step 1)

1) 1M of titanium isopropoxide (TIP, ACROS, 98%) in isopropanol (BDH, 99%) was prepared,
2) 28 ml of 1 M TIP-isopropanol solution was slowly added to 72 ml of water under vigorous mixing,
3) The resulting mixture was stirred for 1 hour at 30° C. to ensure complete hydrolysis of the titanium isopropoxide. A white suspension of $(TiO_x(OH)_y)$ X=0–2, Y=4–2X) was obtained.

EXAMPLE 2

Peptization of Hydrolyzed Titanium Precursor (Step 2)

1) 1 M of nitric acid solution was added to the hydrolyzed titanium precursor obtained in Step 1 to give a $[H^+]/[Ti^{4+}]$ of about 0.4,
2) The mixture was heated to at 70° C. to evaporate the isopropanol,
3) The mixture was cooled to room temperature and kept well mixed until a stable sot is formed,
4) The concentration of titanium dioxide sol was adjusted to 0.28M.

EXAMPLE 3

Addition of Polyethylene Glycol (PEG) Into the Titanium Dioxide Sol (Step 3)

1) 5 weight percent of polyethylene glycol (PEG) with an average molecular weight of 400 g/mole (ACROS) was added to the titanium dioxide sot (A) prepared in step 2 under vigorous stirring.
2) The mixture was stirred for 5 hours at room temperature to obtain the polymer-titanium dioxide sol (B).

EXAMPLE 4

Microwave Treatment, Drying, and Calcination of Polymer-Titanium Dioxide Sol (Steps 4 and 5)

1) 50 mL of polymer-titanium dioxide sot (B) was placed in a 100 mL Teflon lined digestion vessel (MDR-1000/6/100/110) and sealed,
2) The vessel was placed in a microwave oven (MLS-1200 MEGA, MILESTONE) and heated at 90 W for 20 minutes to crystallize and grow the titanium dioxide,
3) A polymer-titanium dioxide paste (C)-90 W with a composition of $HNO_3$ (about 5.9 wt %), polymer (about 53.4 wt %), titanium dioxide (about 32.7 wt %) and trace water was obtained by drying the sol in an oven at 65° C. or vacuum drying at room temperature. The paste could be used for direct coating of a substrate or used to prepare powder samples,
4) (C)-90 W was then calcined at 450° C. for 5 h to get (D)-90 W sample.

The same procedures with microwave treatment at powers 0 W and 120 W were conducted to obtain samples (C)-0 W and (C)-120 W, (D)-0 W and (D)-120 W.

EXAMPLE 5

Microwave Treatment, Drying, and Calcination of Polymer-Free Titanium Dioxide Sol (Step 4' and 5')

1) 50 mL of titanium dioxide sol (A) was placed in a 100 mL Teflon lined digestion vessel (MDR-1000/6/100/110) and sealed,
2) The vessel was placed in a microwave oven (MLS-1200 MEGA, MILESTONE) and heated at 90 W for 20 minutes to crystallize and grow the titanium dioxide, titanium dioxide gel (E)-90 W was obtained by following drying in vacuum box at room temperature. (To distinguish samples treated with different microwave powers, the sample treated by 90 W microwave is referred as (E)-90 W.
3) (E)-90 W sample was then calcined at 450° C. for 5 h to get (F)-90 W.

The same procedures with microwave treatment at powers 0 W and 120 W were conducted to obtain samples (E)-0 W and (E)-120 W, (F)-0 W and (F)-120 W.

Section II. Coating Methods

Several coating methods were developed and compared in the present invention for titanium dioxide coating onto substrates. The adhesion and thickness of the coating were compared. Results found that brush-coating, also termed as scratch-proof coating, which uses polymer-titanium dioxide paste, could yield titanium dioxide coatings with 1–10 monolayers.

EXAMPLE 6

Drain-Coating of Commercial P25 Titanium Dioxide (the Thickness is Controlled by the Amount and Concentration of the Titanium Dioxide Suspension or Sol and Coating Times)

1) Commercial P25 titanium dioxide from Degussa was milled and sieved to obtain uniform powder size.
2) About 0.05 g of sieved titanium dioxide was suspended in 50 mL of distilled, deionized water.
3) The suspension was sonicated for 30 minutes at room temperature.
4) About 0.4 mL of nitric acid was added to the suspension during sonication.
5) An aluminum plate (2.5 cm×2.5 cm square) was cleaned by rinsing in water and acetone.
6) The aluminum plate was placed in a container and 10 mL of titanium dioxide suspension was added.
7) The suspension was dried slowly at about 65° C. in air, forming a coating on the surface.
8) The coated sample was then calcined at 200° C. for 1 h.

EXAMPLE 7

Drain-Coating of Commercial P25 Titanium Dioxide with Addition of PEG Polymer

1) Commercial P25 titanium dioxide from Degussa was milled and sieved to obtain uniform powder size.
2) About 0.1 g of sieved titanium dioxide was suspended in 50 mL of distilled, deionized water.
3) The suspension was sonicated for 30 minutes at room temperature.
4) About 0.1 g of PEG 400 (ACROS) was added to the suspension during sonication to give an overall polymer concentration of 5 wt % in the solution.
5) An aluminum plate (2.5 cm×2.5 cm square) was cleaned by rinsing in water and acetone.
6) The aluminum plate was placed in a container and 10 mL of titanium dioxide suspension was added.
7) The suspension was dried slowly at about 65° C. in air, forming a coating on the surface.
8) The coated sample was then calcined at 450° C. for 1 h to remove the PEG polymer.

EXAMPLE 8

Drain-Coating of Titanium Dioxide Sol (A)

1) The concentration of titanium dioxide sol (A) prepared in Example 2 was adjusted to 0.28 M.
2) An aluminum plate (2.5 cm×2.5 cm square) was cleaned by rinsing in water and acetone.
3) The aluminum plate was placed in a container and 10 mL of titanium dioxide sol (A) was added.
4) The suspension was dried slowly in vacuum at room temperature, forming a uniform coating on the surface.
5) The coated sample can be used as dried or heat treated to a higher temperature.

EXAMPLE 9

Drain-Coating of Polymer-Titanium Dioxide Sol (B)

1) The concentration of polymer-titanium dioxide sol (B) prepared in Example 3 can be adjusted to 0.28M titanium dioxide.
2) An aluminum plate (2.5 cm×2.5 cm square) was cleaned by rinsing in water and acetone.
3) The aluminum plate was placed in a container and 10 mL of polymer-titanium dioxide sol (B) was added.
4) The suspension was dried slowly in vacuum at room temperature, forming a uniform coating on the surface.
5) The coated sample was calcined in air at 450° C. for 1 h to remove PEG

EXAMPLE 10

Dip-Coating of Commercial P25 Titanium Dioxide (the Thickness is Control by the Amount and Concentration of the Titanium Dioxide Suspension or Sol and Contact Time)

1) Commercial P25 titanium dioxide from Degussa was milled and sieved to obtain uniform powder size.
2) About 0.05 g of sieved titanium dioxide was suspended in 50 mL of distilled, deionized water.
3) The suspension was sonicated for 30 minutes at room temperature.
4) About 0.4 ml of nitric acid was added to the suspension during sonication.
5) An aluminum plate was cleaned by rinsing in water and acetone.
6) The aluminum plate was immersed in a vessel containing the titanium dioxide suspension.
7) After 4.5 min the plate was removed and the excess liquid was drained.
8) The process was repeated three times to obtain a coating.

9) The coated sample was dried and heat treated.

Note: Unlike drain coating, both surfaces of the plate is coated during dip-coating process, unless one of the surfaces is covered.

EXAMPLE 11

Dip-Coating of Commercial P25 Titanium Dioxide with Addition of PEG Polymer

1) Commercial P25 titanium dioxide from Degussa was milled and sieved to obtain uniform powder size.
2) About 0.1 g of sieved titanium dioxide was suspended in 50 mL of distilled, deionized water.
3) The suspension was sonicated for 30 minutes at room temperature.
4) About 0.1 g of PEG 400 (ACROS) was added to the suspension during sonication to give an overall polymer concentration of 5 wt. % in the solution.
5) An aluminum plate was cleaned by rinsing in water and acetone.
6) The aluminum plate was immersed in a vessel containing the titanium dioxide suspension.
7) After 4.5 min the plate was removed and the excess liquid was drained.
8) The process was repeated three times to obtain a coating.
9) The coated sample was dried and heat treated.

Note: Unlike drain coating, both surface of the plate is coated during dip-coating process, unless one of the surface is covered.

EXAMPLE 12

Dip-Coating of Titanium Dioxide Sol (A)

1) The concentration of titanium dioxide sol (A) prepared in Example 2 was adjusted to 0.28 M.
2) An aluminum plate was cleaned by rinsing in water and acetone.
3) The aluminum plate was immersed in a vessel containing the titanium dioxide sol (A).
4) After 4.5 min the plate was removed and the excess liquid was drained.
5) The process can be repeated three times to obtain a coating.
6) The coated sample can then be dried and heat treated.

Note: Unlike drain coating, both surfaces of the plate is coated during dip-coating process, unless one of the surfaces is covered.

EXAMPLE 13

Dip-Coating of Polymer-Titanium Dioxide Sol (B)

1) The concentration of polymer-titanium dioxide sol (B) prepared in Example 3 was adjusted to 0.28M.
2) An aluminum plate was cleaned by rinsing in water and acetone.
3) The aluminum plate was immersed in a vessel containing the polymer-titanium dioxide sol (B).
4) After 4.5 min the plate was removed and the excess liquid was drained.
5) The process can be repeated more than once to obtain a coating.
6) The coated sample can then be dried and heat treated at 450° C. for 1 h to remove PEG Note: Unlike drain coating, both surface of the plate is coated during dip-coating process, unless one of the surfaces is covered.

EXAMPLE 14

Scratchproof-Coating of Commercial P25 Titanium Dioxide with Addition of PEG Polymer 1) Commercial P25 titanium dioxide from Degussa was milled and sieved to obtain uniform powder size.
2) About 0.1 g of sieved titanium dioxide was suspended in 50 mL of distilled, deionized water.
3) The suspension was sonicated for 30 minutes at room temperature.
4) About 0.1 g of PEG 400 (ACROS) was added to the suspension during sonication to give an overall polymer concentration of 5 wt. % in the solution.
5) The polymer containing suspension was dried in air at 65° C. to slowly remove the liquid.
6) A paste containing of about 40wt % titanium dioxide, 58 wt % PEG and trace water was obtained.
7) About 4 g of paste (T=25° C., relative humidity=60%) was used for each square meter of surface to be coated.
8) The paste was spread in a thin uniform line along the top edge of the surface.
9) A brunt brush or scrapper was positioned at the upper edge of the paste.
10) A uniform force was applied as the brunt brush or scrapper was dragged from the top edge to the lower edge of the surface.
11) A uniform film of paste was formed on the surface.
12) The step was repeated in the opposite direction using the remaining paste from the first coating.
13) The plate was then calcined at 450° C. for 1 h to remove the PEG polymer.

EXAMPLE 15

Scratchproof-Coating of Polymer-Titanium Dioxide Sol (B)

1) The polymer-titanium dioxide sol (B) prepared in Example 3 was dried in air at about 65° C. to slowly remove the liquid.
2) A paste containing of about 30 wt % titanium dioxide, 56.6 wt % PEG and trace water was obtained.
3) About 4 g of paste (T=25° C., relative humidity=60%) was used for each square meter of surface to be coated.
4) The paste was spread in a thin uniform line along the top edge of the surface.
5) A brunt brush or scrapper was positioned at the upper edge of the paste.
6) A uniform force was applied as the brunt brush or scrapper was dragged from the top edge to the lower edge of the surface.
7) A uniform film of paste was formed on the surface.
8) The step was repeated in the opposite direction using the remaining paste from the first coating.
9) The plate was then calcined at 450° C. for 1 h to remove the PEG polymer.

EXAMPLE 16

Scratchproof-Coating of Gold-TiO$_2$

1) About 6 ml of HAuCl$_4$ (0.01M) was added into the TiO$_2$ sol (A) prepared in Example 2.
2) 5 weight percent of polyethylene glycol (PEG) with an average molecular weight of 400 g/mole (ACROS) was added to above gold modified TiO$_2$ sol.
3) The polymer containing gold modified TiO$_2$ sol was dried in (vacuum at room temperature or) air at about 65° C. to slowly remove the liquid.
4) A paste containing of about 0.5 wt % Au, 30 wt % TiO$_2$, 56.6 wt % PEG and trace water was obtained.
5) About 4 g, but not more than 10 g of paste (T=25° C., RH=60%) is used for each square meter of surface to be coated.
6) The paste is spread in a thin uniform line along the top edge of the surface.
7) A brunt brush or scrapper was position at the upper edge of the paste.
8) A uniform force was applied as the brunt brush or scrapper was drag from the top edge to the lower edge of the surface.
9) A uniform film of paste is formed on the surface.
10) The step can repeated in the opposite direction using the excess amount paste from the first coating.
11) The plate is then calcined at 450° C. for 1 h to remove the PEG polymer.

The above process could also be used to prepare other metal supported titanium dioxide scratch-proof coating, i.e. Ag/titanium dioxide, Cu/titanium dioxide, Pt/titanium dioxide, Pd/titanium dioxide.

Discussion

The above examples describe the most preferred embodiments to carry out the present invention. Many modifications may be made to the materials, process, or steps. For example, in Example 2, the concentration of titanium dioxide sol can be adjusted to between 0.2–1.0 M; in Examples 4 and 5, the power of the microwave treatment can be set at 0–200 W; in Examples 6, 7, 10, 11, 14 the quantity of the sieved P25 titanium dioxide suspended in deionized water can be 0.05–0.3 g; the nitric acid used in Examples 6 and 10 can be 0.4–2.4 ml; in Examples 8 and 12, the titanium dioxide sol (A) can be adjusted to 0.05–0.8M; in Examples 9 and 13, the polymer-titanium dioxide sol (B) can be adjusted to 0.05–0.8 M. In Examples 10 and 11 and 12 and 13, the substrate can be immersed in the sol or suspension for any preset length of time. In Examples 14 and 15, the quantity of paste used to form 1–10 monolayers coating on a surface can be 4 g–10 g per square meter of surface. In above examples, the substrate used can be a stainless steel or any other substrate that has a surface.

Section III. Characterization Methods

1) The Crystal Size and Structure

X-ray Diffraction Analysis (Philips 1830)
1. The catalyst powder was ground and shifted to produce a fine powder.
2. The powder was placed in an aluminum holder and placed in the sample holder of X-ray diffractometer.
3. A CuKα X-ray source was used and the X-ray diffraction was recorded for 20°<2θ<60° by stepscanning at 0.05° increments.

Table 1 lists the X-ray diffraction data of titanium dioxide crystals that has pure anatase structure (Cu Kα radiation source, wavelength: 1.54056 Å, cited from 1998 JCPDS-International Centre for Diffraction Data). Table 2 lists the X-ray diffraction data of titanium dioxide crystals that has pure Rutile structure. (Cu Kα radiation source, wavelength: 1.54056 Å, cited from 1998 Joint Committee on Powder Diffraction Standards-International Centre for Diffraction Data)

TABLE 1

Pure Anatase Structure

| 2θ | d (Å) | Intensity | (hkl) |
|---|---|---|---|
| 25.281 | 3.52 | 100 | 101 |
| 36.946 | 2.431 | 10 | 103 |
| 37.80 | 2.378 | 20 | 004 |
| 38.575 | 2.332 | 10 | 112 |
| 48.049 | 1.892 | 35 | 200 |
| 53.890 | 1.6999 | 20 | 105 |
| 55.060 | 1.6665 | 20 | 211 |
| 62.119 | 1.4930 | 4 | 213 |
| 62.688 | 1.4808 | 14 | 204 |

TABLE 2

Pure Rutile Structure

| 2θ | d (Å) | Intensity | (hkl) |
|---|---|---|---|
| 27.446 | 3.247 | 100 | 110 |
| 36.085 | 2.487 | 50 | 101 |
| 39.187 | 2.297 | 8 | 200 |
| 41.225 | 2.188 | 25 | 111 |
| 44.050 | 2.054 | 10 | 210 |
| 54.322 | 1.6874 | 60 | 211 |
| 56.640 | 1.6237 | 20 | 220 |
| 62.740 | 1.4797 | 10 | 002 |
| 64.038 | 1.4528 | 10 | 310 |

(2) Micro-Raman Analysis
1. The titanium dioxide powder was placed on a glass microscope slide. The spectral resolution was set at approximately at 1.0 cm$^{-1}$ and the spot size was about two micrometers in diameter.
2. The Raman spectra of the titanium dioxide sample were measured using a Renishaw 3000 micro-Raman system with an Olympus BH-2 microscope. The objective lenses with 20× and 50× magnifications were selected. The excitation source used was an Argon laser operating at 514.5 nm with an output power of 25 mW.
3. The crystal size was measured from Raman line broadening as described by Iida and coworkers (Y. Iida M. Furukawa, T. Aoki, T. Sakai. *Appl. Spectrosc.* 1998, 52, 673).

The characteristic peaks of pure anatase are located at 395, 511, 634, 795 cm$^{-1}$ and the characteristic peaks of rutile are located at 446 and 611 cm$^{-1}$, respectively. (cited from R. Nyqauist, R. Kagel, C. Putzig, M. Leugers, *Handbook of Infrared and Raman Spectra of Inorganic Compounds and Organic Salts*, Academic Press, 1996)

(3) BET Surface Area

The BET surface area of the catalyst is measured by nitrogen physisorption.

Procedure:
1. The capped quartz tube sample holder from Coulter SA 3100 nitrogen physisorption apparatus was weighted.

2. About 0.1 g of catalyst was measured and placed inside the sample holder.
3. The holder was connected to the out-gassing port of the Coulter SA 3100.
4. The sample is outgassed at desired temperature for 2 hr.
5. The catalyst was weighed after outgassing and nitrogen physisorption was conducted at 77 K.
6. The BET surface area was calculated from the physisorption data.

2) Titanium Dioxide Morphology

High resolution image of the titanium dioxide was imaged using AFM to determine the size, morphology and aggregation.

Procedure:
1. Mica was cleaved to produce a fresh and clean substrate.
2. A 10 μL of titanium dioxide suspended in water was placed on top of freshly cleaved Mica.
3. The droplet was allowed to dry at room temperature.
4. The Mica was attached to a sample holder and placed on the microscope base (Nanoscope IIIa, DI).
5. A new Nanosensor tip was placed in the cantilever holder and assembled in the microscope.
6. The tip was brought close to the surface and the computer was allowed to approach under automation.
7. Digital images of the sample deposited onto the surface was collected and analyzed using image analysis software (Nanoscope 4.23) (version 4.42r2) to obtain the sample morphology, size and aggregation.

3) Titanium Dioxide Surface Chemistry

Fourier Transform Infrared Spectroscopic Analysis
1. About 10 mg of potassium bromide (reference sample) was placed on the sample holder of a diffuse reflectance infrared Fourier transform spectroscopic (DRIFTS) cell.
2. The cell was positioned in a Praying Mantis mirror assembly (Harrick) and placed in the Perkin Elmer Spectrum GX FTIR.
3. The chamber was purged with dry and carbon dioxide free air until the signal stabilized after 15 min.
4. Reflectant mode of the FTIR was used to observe the background signal.
5. About 0.05 g sample was placed on the sample holder of the diffuse reflectance infrared Fourier transform spectroscopic (DRIFTS) cell.
6. The cell was positioned in a Praying Mantis mirror assembly and placed in the FTIR.
7. The chamber was purged with 100 sccm dry and carbon dioxide free air until the signal stabilized after 15 min.
8. Reflectant mode of the FTIR was used to record the spectrum at 100° C. and 150° C.
9. The sample was scanned from 450 $cm^{-1}$ to 4000 $cm^{-1}$ at a resolution of 1 $cm^{-1}$ and 256 scans were collected.

4) Properties of Titanium Dioxide Coating (1) Scanning Electron Microscopy
1. The surface morphology of coated sample was analysed by SEM (JEOL, JSM6300F).
2. The coated sample was cut into small piece and placed on aluminum pin stubs.
3. The sample was gold-coated by using a sputter coater (Edwards, Scancoat Six) prior to SEM analysis.
4. The sample was outgassed at high vacuum and applied 10 KV voltage to image.

(2) Micro-Raman Spectroscopy
1. The titanium dioxide-coated plate was placed on a glass microscope slide. The spectral resolution was set at approximately at 1.0 $cm^{-1}$ and the spot size was about two micrometers in diameter.
2. The Raman spectra of the titanium dioxide sample were measured using a Renishaw 3000 micro-Raman system with an Olympus BH-2 microscope. The objective lenses with 20× and 50× magnifications were selected. The excitation source used was an Argon laser operating at 514.5 nm with an output power of 25 mW.

The characteristic peaks of pure anatase are located at 395, 511, 634, 795 $cm^{-1}$ and the characteristic peaks of rutile are located at 446 and 611 $cm^{-1}$, respectively. (cited from R. Nyquist, R. Kagel, C. Putzig, M. Leugers, *Handbook of Infrared and Raman Spectra of Inorganic Compounds and Organic Salts*, Academic Press. 1996)

(3) X-ray Photoelectron Spectroscopy

The surface composition and chemistry of the catalyst was determined by X-ray photoelectron spectroscopy (XPS).

Procedure:
1. The catalyst powder was pressed onto an indium foil.
2. The foil was placed inside the X-ray photoelectron spectroscopy (Physical Electronics PHI 5600).
3. The sample was outgassed at ultra high vacuum.
4. Monochromatic Al Kα X-ray source with 350 W at 45° C. was used to bombard the sample.
5. The data was collected using carbon 1S as the reference.

Section IV. Results (1) Characterization Results of Titanium Dioxide Samples

Several characterization methods were used to characterize samples (A)–(F) prepared in Examples 1–5 of the present invention. Results are described below.

Figure 2:
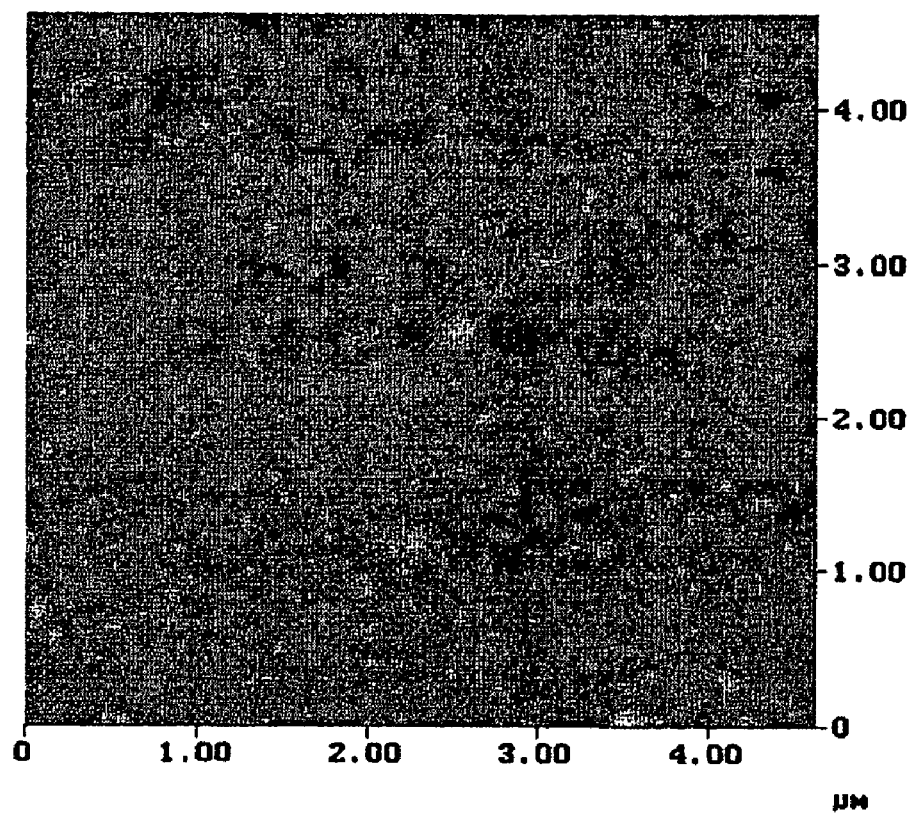
FIG. 2 is the tapping-mode AFM image of titanium dioxide sol prepared by sol-gel method.

FIG. 2 displays the atomic force microscope image of titanium dioxide sol (A) prepared by Example 2. The sols are spherical in shape and have a narrow size distribution around 20 nm. The width of the particles includes the hydration layer.

Figure 3:
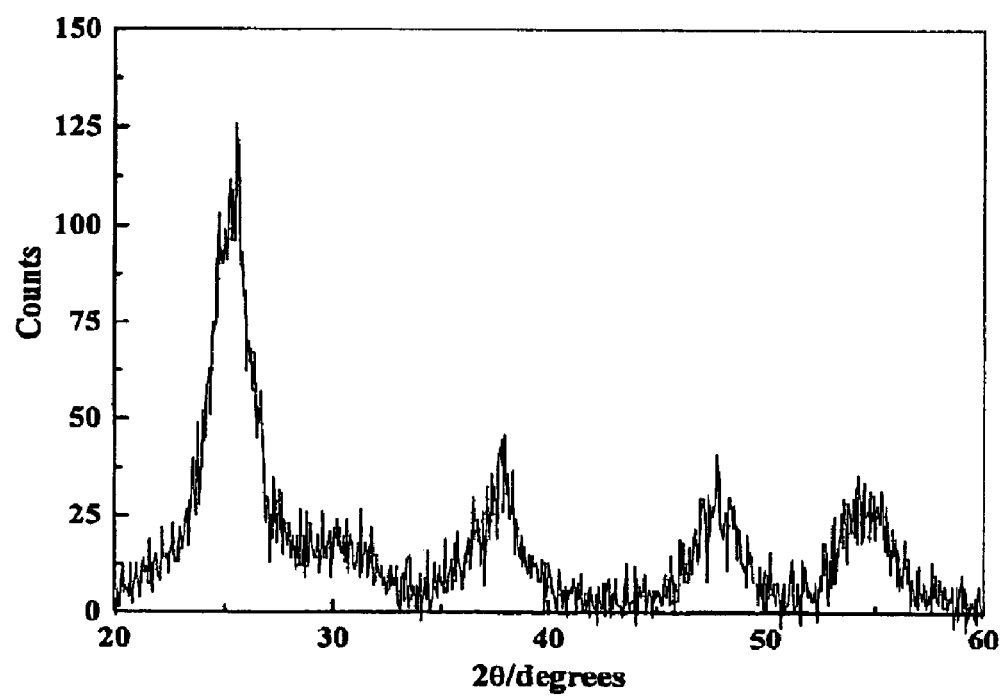
FIG. 3 is the X-ray diffraction pattern of titanium dioxide sample by Example 2.

The X-ray diffraction of the dried titanium dioxide sol (A) is shown in FIG. 3. It displays characteristic anatase diffraction peaks at 2θ values around 25°, 38°, 47° and 54°, A small peak signal at 2θ around 31° is ascribed to titanium dioxide brookite traces (Reference: 1998 JCPDS-International Centre for Diffraction Data). Measuring the full width at half maximum (FWHM) of the peak at 2θ equal to 25°, the size of titanium dioxide sol (A) was calculated to be 3.3 nm using Scherrer equation.

Figure 4:
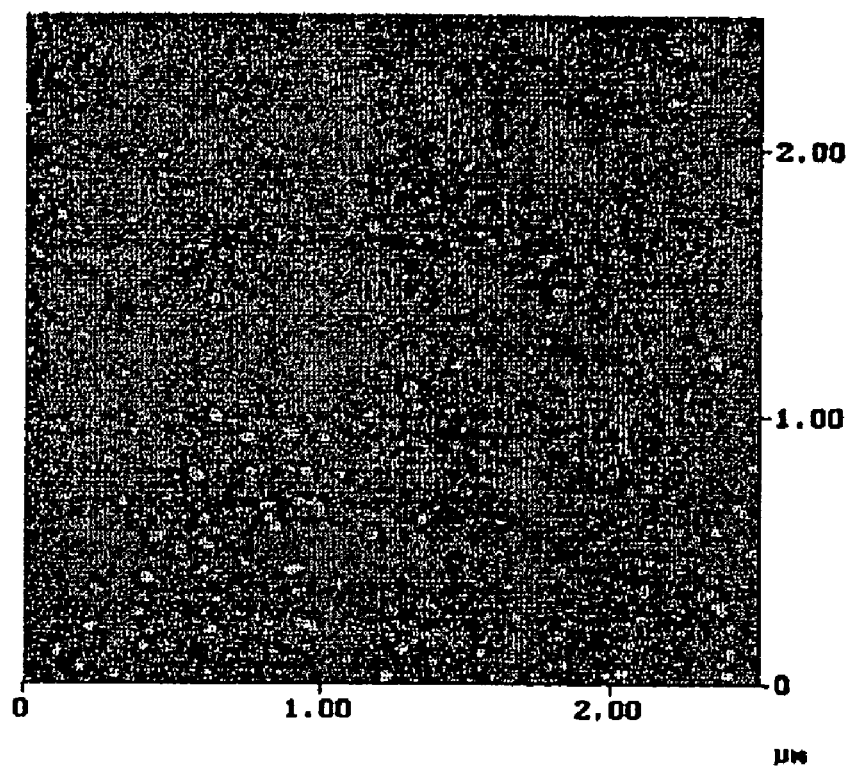
FIG. 4 is the tapping-mode AFM image of polymer-titanium dioxide sol (B).

FIG. 4 displays the atomic force microscope image of polymer-titanium dioxide sol (B) prepared by Example 3. The polymer-titanium dioxide sol (B) was slight blue in color. The size and shape of polymer-titanium dioxide sol (B) are similar to the titanium dioxide sol (A) shown in FIG. 2.

Table 3 lists twelve titanium dioxide samples used for characterization (No.1 to No.12). Samples No.1–3 were prepared from (F)-0 W with subsequent thermal treatment at room temperature, 200° C., and 400° C., respectively. Samples No. 4–6 were prepared from (F)-90 W with subsequent thermal treatment at room temperature, 200° C., and 400° C., respectively. Samples No. 7–9 were prepared from (F)-120 W with subsequent thermal treatment at room temperature, 200° C., and 400° C., respectively. Samples No. 10–12 refer to titanium dioxide crystals prepared by polymer-titanium dioxide with microwave treatment at 0, 90, and 120 W followed by a thermal treatment at 450° C. Table 3 also summarizes the particle size, BET surface area and types of pore structure for the samples. High temperature treatment led to larger particle size, smaller surface area and mesoporous structure.

TABLE 3

XRD and BET characterization results

| Sample No. | Sample source | Heat treatment conditions (° C.) | Specific surface area (m²/g) | Gain size[a] (nm) | Type of pore |
|---|---|---|---|---|---|
| 1 | (F)-0 W | Room-temperature | 132.567 | 3.29 | Micropore |
| 2 | (F)-0 W | 200 | 166.953 | 4.61 | Mesopore |
| 3 | (F)-0 W | 400 | 105.904 | 6.29 | Mesopore |
| 4 | (F)-90 W | Room-temperature | 156.031 | 4.21 | Micropore |
| 5 | (F)-90 W | 200 | 169.221 | 4.35 | Micropore |
| 6 | (F)-90 W | 400 | 128.878 | 5.22 | Mesopore |
| 7 | (F)-120 W | Room-temperature | 191.194 | 4.55 | Micropore |
| 8 | (F)-120 W | 200 | 192.326 | 4.34 | Micropore |
| 9 | (F)-120 W | 400 | 109.345 | 7.50 | Mesopore |
| 10 | (D)-0 W | 450 | 162.061 | 7.19 | Mesopore |
| 11 | (D)-90 W | 450 | 207.602 | 7.16 | Mesopore |
| 12 | (D)-120 W | 450 | 139.447 | 7.49 | Mesopore |

[a]gain size calculated by XRD analysis.

Figure 5:
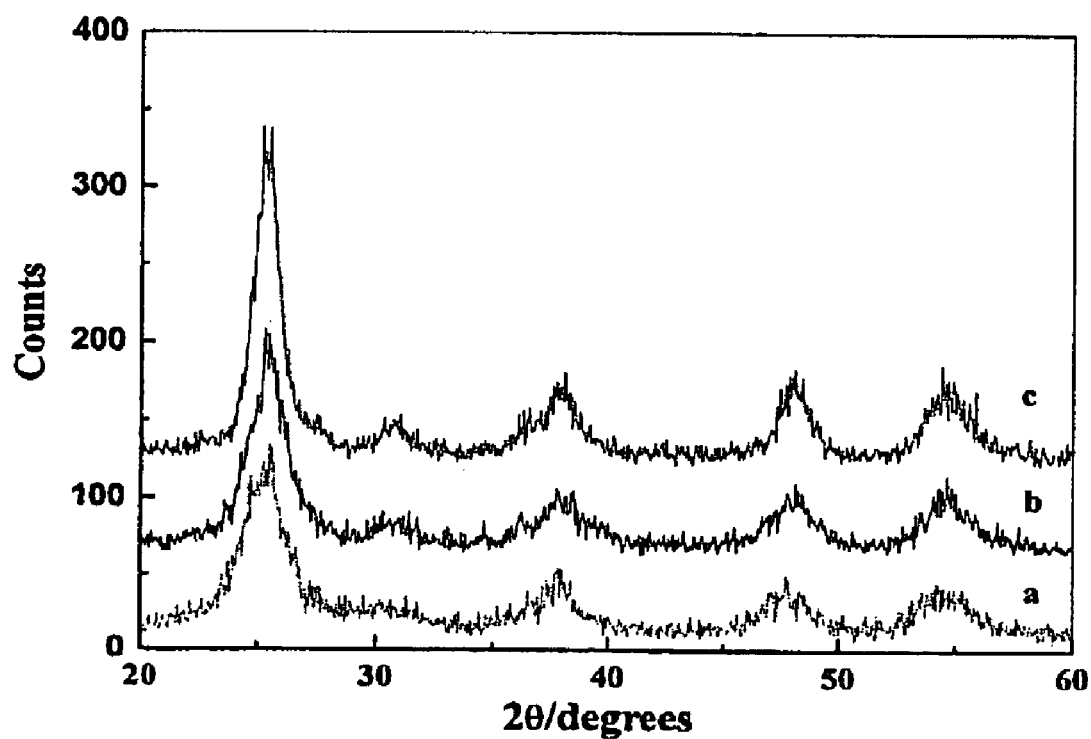
FIG. 5 is the X-ray diffraction patterns of titanium dioxide sample after treatment at different conditions, (a). dried in the vacuum box, (b). calcined at 200° C., (c). calcined at 400° C.

FIG. 5 shows the XRD patterns of titanium dioxide sample No.1, 2 and 3. The characteristic anatase diffraction peaks are present in all samples. Broader peaks for samples thermally treated at lower temperatures indicate smaller particle size (see Table 3). Trace amount of brookite is present in all samples.

Samples No.10–12 (D) in Table 3 show that these samples possessed higher surface area compared to similar titanium dioxide (F) crystallized from titanium dioxide-sol (A). This indicates that the addition of PEG polymer restricted the aggregation of titanium dioxide during crystallization and growth.

Figure 6:
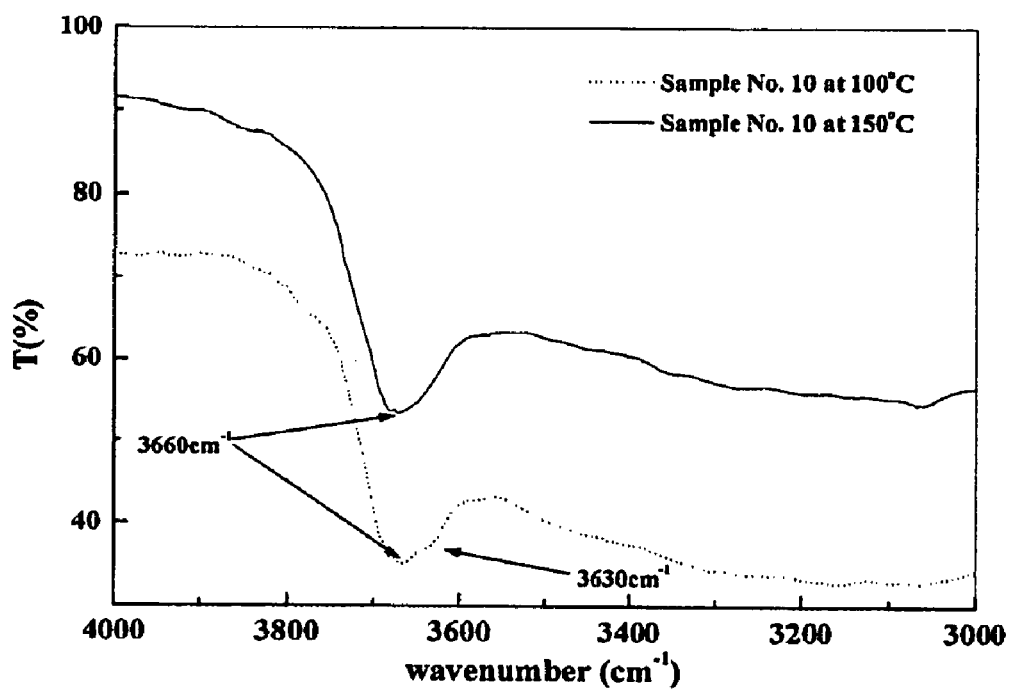
FIG. 6 is the FT-IR spectra of sample No. 10 record at 100° C. and 150° C., respectively.

FIG. 6 displays the infrared spectra of crystallized titanium dioxide (sample No. 10) prepared from PEG-titanium dioxide with no microwave treatment followed by thermal treatment at 450° C. The samples were outgassed and analyzed at 100° C. and 150° C., respectively. It is clear from FIG. 6 that signals at around 3660 and 3630 $cm^{-1}$ appear in the samples. These two bands are considered to possess acidic nature. The signal at lower frequency corresponds to more acidic bridged hydroxyls. R. A. Van Santen, P. W. N. M. van, Leeuwen, J .A. Moulijn, B. A. Averill, Studies in Surface Science and Catalysis, 123, (1999), 463.)

Figure 7:
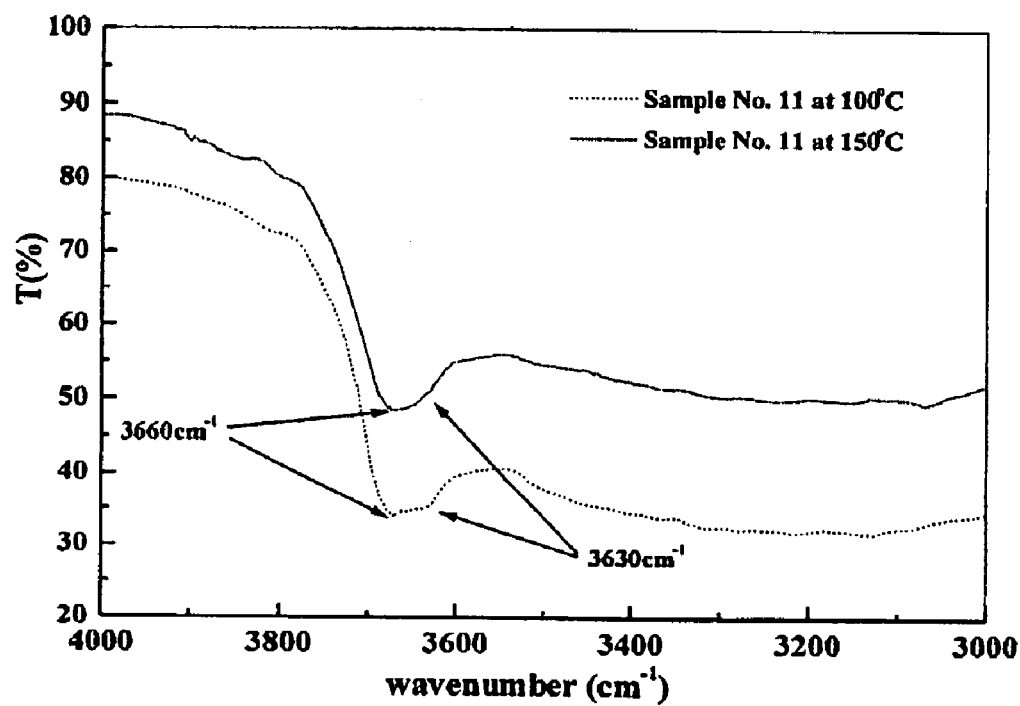
FIG. 7 is the FT-IR spectra of sample No. 11 recorded at 100° C. and 150° C., respectively.

FIG. 7 displays the infrared spectra of crystallized titanium dioxide (Sample No. 11) prepared from PEG-titanium dioxide with 90 W microwave treatment followed by thermal treatment at 450° C. The samples were outgassed and analyzed at 100° C. and 150° C., respectively. It is clear from FIG. 7 that signals at around 3660 and 3630 $cm^{-1}$ appear in the samples.

Figure 8:
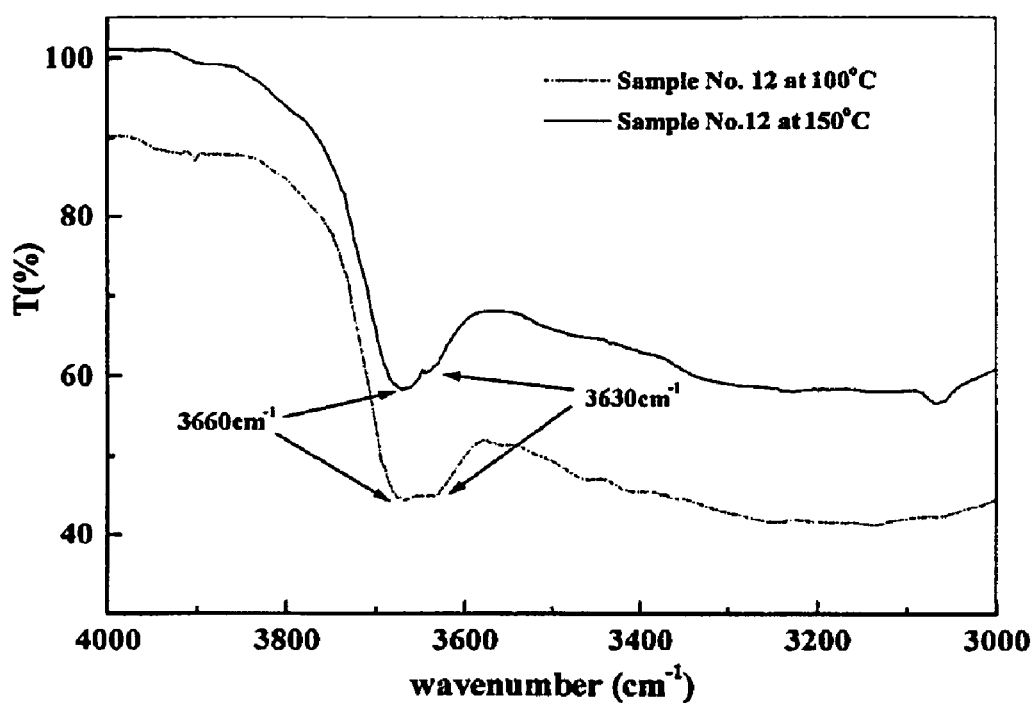
FIG. 8 is the FT-IR spectra of sample No. 12 recorded at 100° C. and 150° C., respectively.

FIG. 8 displays the infrared spectra of crystallized titanium dioxide (Sample No. 12) prepared from PEG-titanium dioxide with 120 W microwave treatment followed by thermal treatment at 450° C. The samples were outgassed and analyzed at 100° C. and 150° C., respectively. It is clear from FIG. 8 that signals at around 3660 and 3630 $cm^{-1}$ appear in the samples.

Comparison of spectra obtained at 100° C. and 150° C. in FIGS. 6, 7 and 8 indicated that the hydroxyls with infrared signal at around 3630 $cm^{-1}$ are more strongly bonded to the sample No. 12 and are more difficult to remove.

The present FTIR spectra results show that the polymer modified titanium dioxide samples possess surface acidic hydroxyl group while an additional microwave treatment step selectively increases the proportion of surface acidic hydroxyl groups of the resultant titanium dioxide sample. The enhanced acidity has a positive effect on the performance of photocatalytic oxidation reaction.

It should be noted that acidity used herein is a relative property which highly depends on the environment in which a reaction is being considered.

Figure 9:
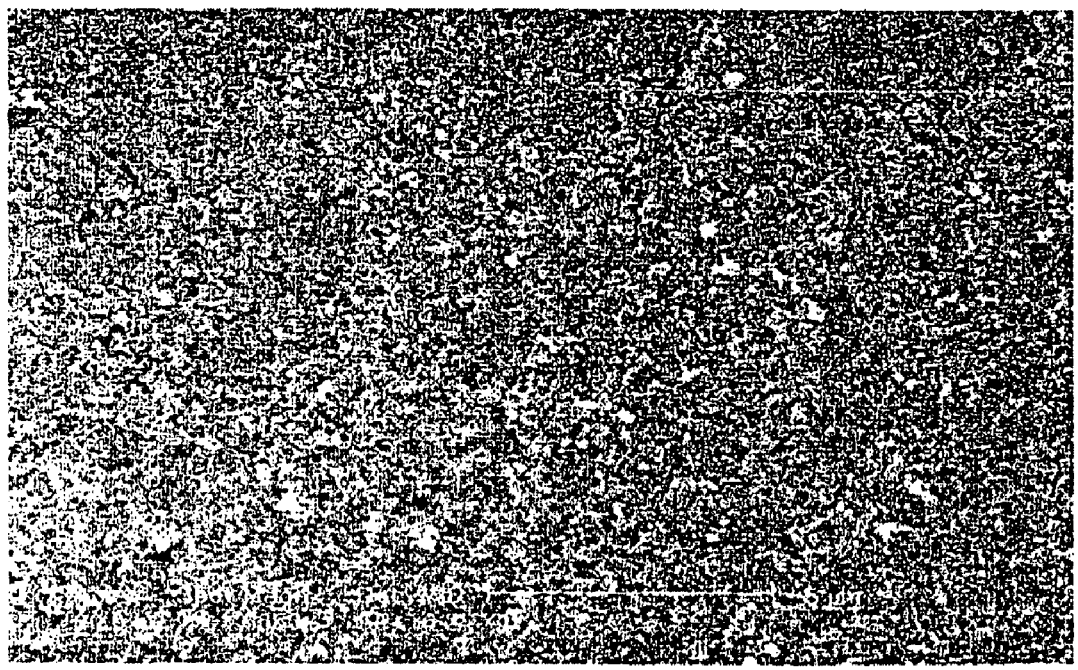
FIG. 9 is the SEM image of P25 powder coating on the substrate.
Figure 10:
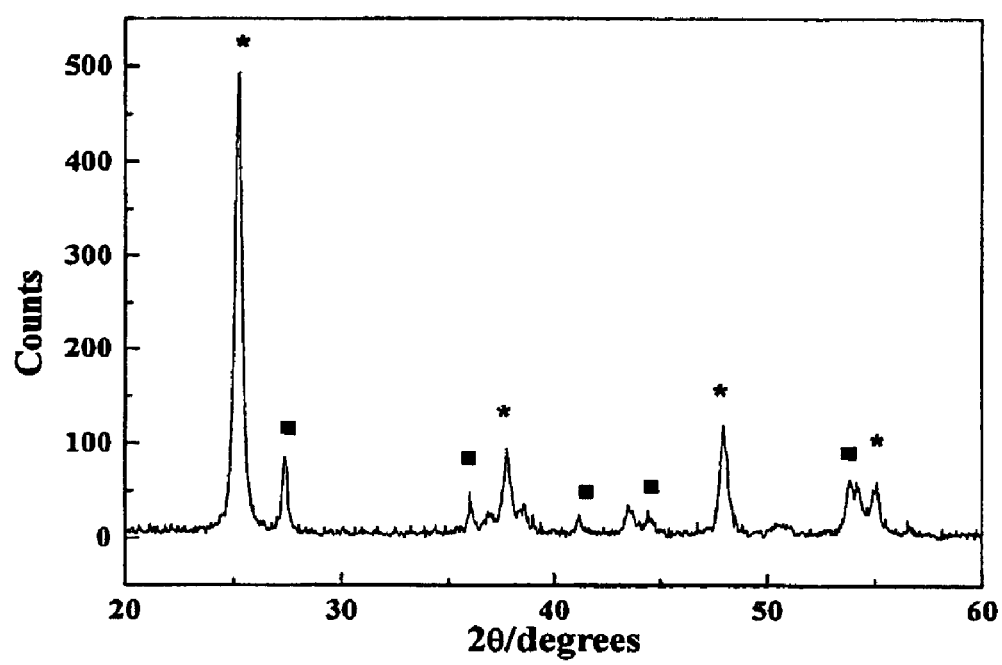
FIG. 10 is the X-ray diffraction pattern of P25 powder coating on the substrate. The symbols of "*" in the picture indicate the characteristic peak of anatase phase, and the symbols of "." imply the characteristic peak of rutile phase.
Figure 11:
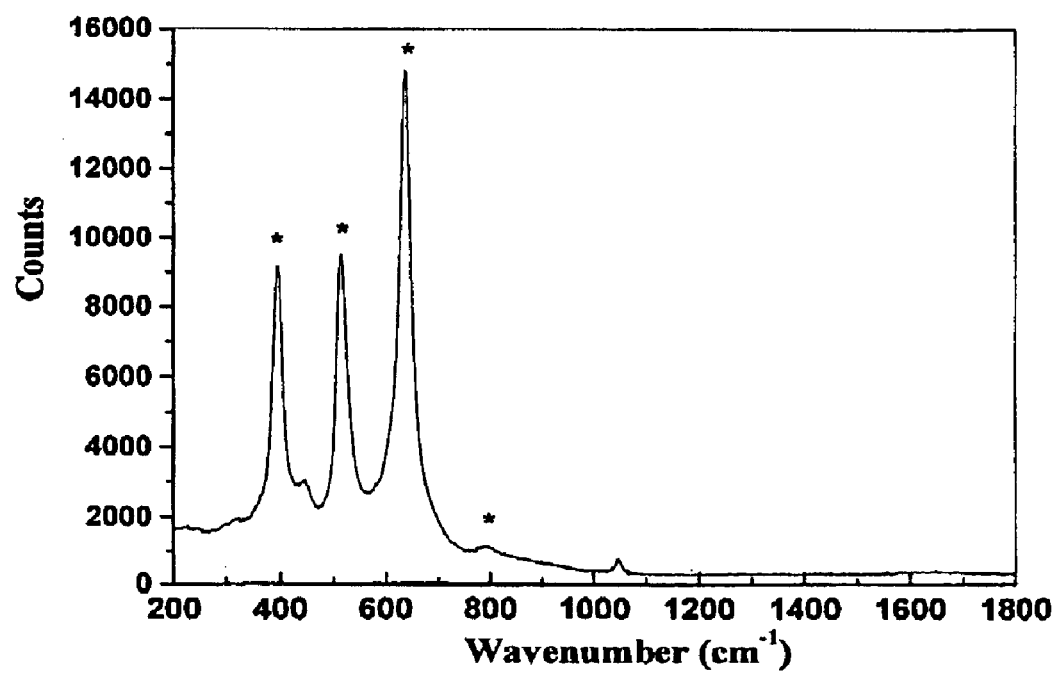
FIG. 11 is the Raman spectrum of P25 powder coating on the substrate. The symbols of "*" in the picture indicate the characteristic peak of anatase phase.

(2) Characterization Results of Coated Substrate (a) Results of Drain-Coating of Commercial P25 Titanium Dioxide FIG. 9 is SEM photo of a titanium dioxide-coated plate prepared by method illustrated in Example 6. The SEM picture shows a thick layer of commercial P25 titanium dioxide was coated on the plate surface. The XRD pattern of the titanium dioxide-coated plate is shown in FIG. 10. The figure shows that both characteristic XRD patterns belonging to anatase and rutile titanium dioxide are present in the coated sample. Micro-Raman spectroscopy confirmed the presence of a uniform coating of anatase-titanium dioxide (FIG. 11). However, the adhesion of the coating is poor and layer can easily delaminate upon touching.

(b) Results of Drain-Coating of Polymer-Titanium Dioxide Sol (B)

Figure 12:
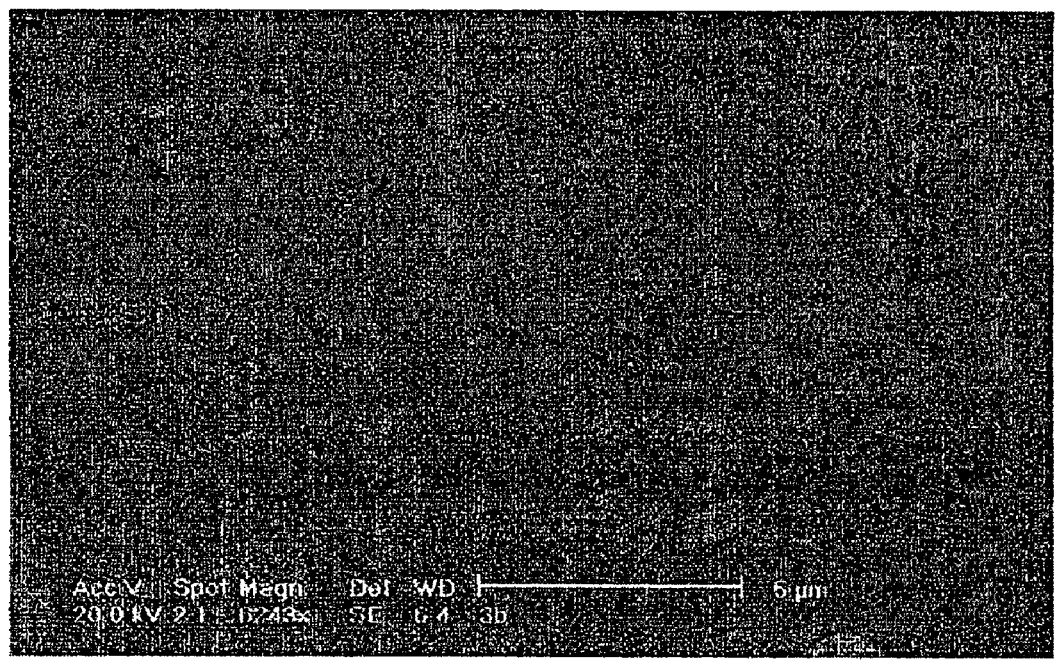
FIG. 12 is the SEM image of polymer-titanium dioxide sol (B) coating on the substrate by drain coating method.
Figure 13:
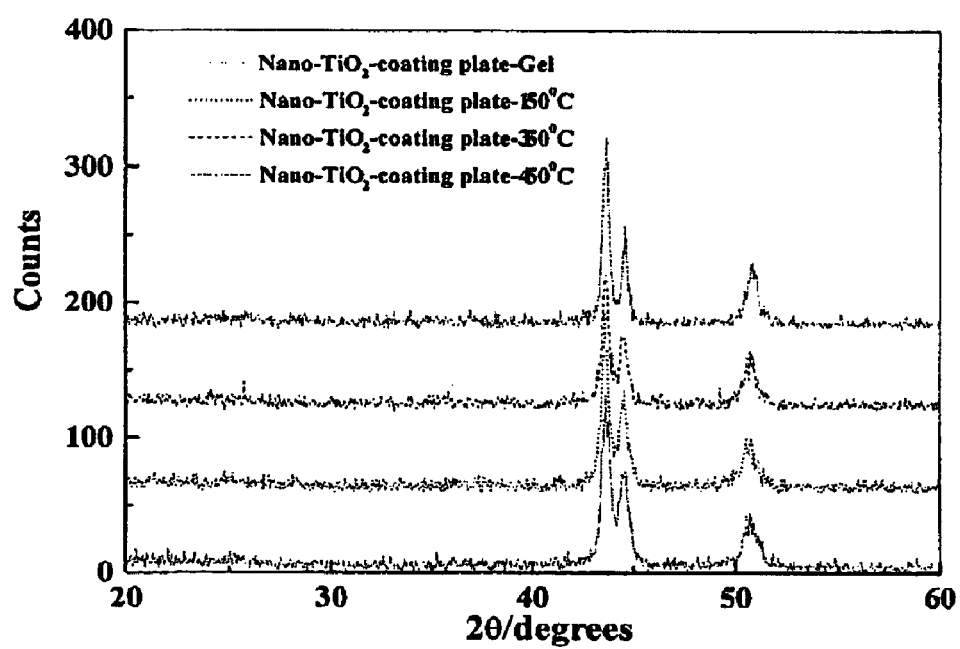
FIG. 13 is the X-ray diffraction patterns of polymer-titanium dioxide sol coating sample by drain coating method.
Figure 14:
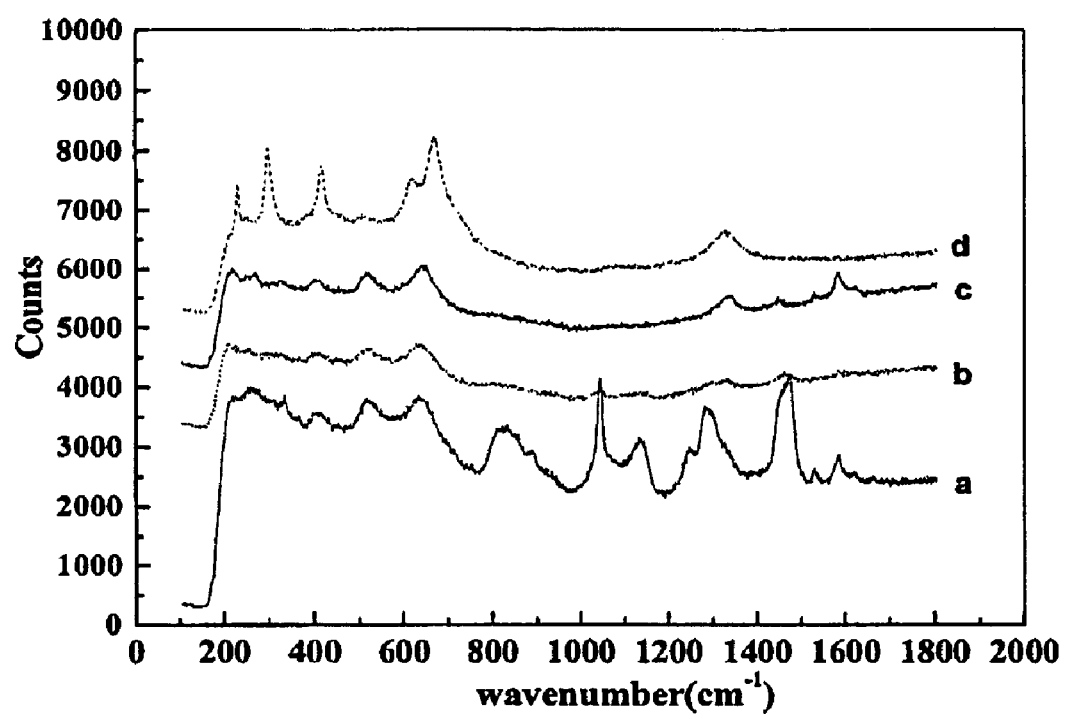
FIG. 14 is the Raman spectra of polymer-titanium dioxide coating sample prepared by drain coating method after different temperature annealing, (a). as-prepared, (b). 150° C., (c). 350° C., (d). 450° C.

FIG. 12 is SEM photo of a titanium dioxide-coated plate prepared by method illustrated in Example 9. The SEM picture shows a plate coated with a thin layer that is less than 10 monolayer of titanium dioxide. The nanosized titanium dioxide are preferentially deposited in the microscopic grooves and channels of the stainless steel plate. FIGS. 13 & 14 are the corresponding XRD and micro-Raman analyses of sample heat treated at different temperatures. The XRD pattern in FIG. 13 belongs only to the substrate confirming the SEM data that a ultrathin layer of titanium dioxide was coated. Micro-Raman is more sensitive the surface and FIG. 14 displays characteristic peaks at 400 $cm^{-1}$, 500 $cm^{-1}$ and 630 $cm^{-1}$, attributed to titanium dioxide anatase phase (Reference: Handbook of Infrared and Raman Spectra of Inorganic Compounds and Organic Salts 4-Volume Set <Volume 2>). The broad peaks at 800 to 1800 $cm^{-1}$ regions belong to the polymer, which disappears with high temperature heat treatment of the coated samples.

This method can provide titanium dioxide coating plate with good adhesion that can withstand washing and normal usage without delamination.

(c) Dip-Coating of P25 Powder

Commercial P25 powder was tried to be coated by dip-coating process as listed as Examples 10 and 11. Using P25 powder is capable of yielding a uniform coating layer, however, the adhesion is poor and powder easily delaminate by gently touch.

(d) Scratchproof-Coating of Polymer-Titanium Dioxide Paste

Figure 15A:
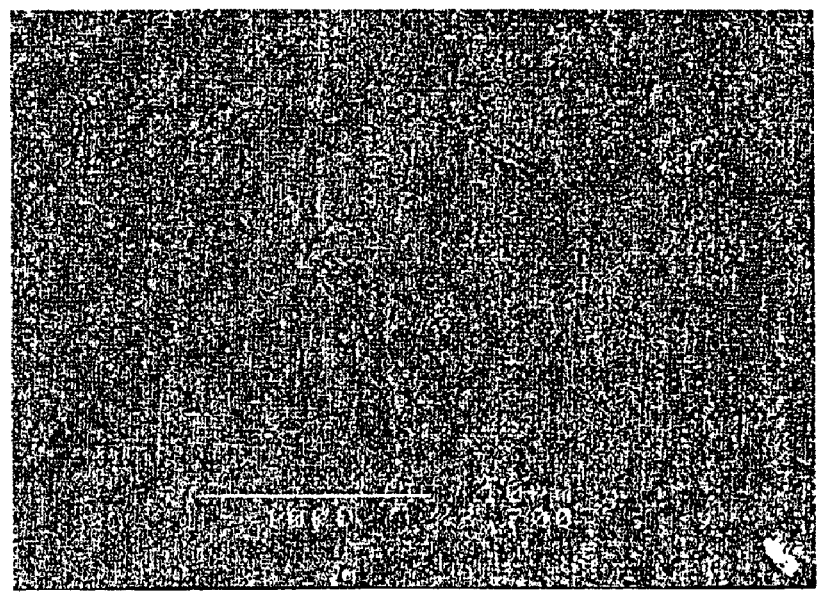
FIG. 15A and 15B are the SEM images of titanium dioxide coating stainless steel samples by scratch-proof coating method.
Figure 15B:
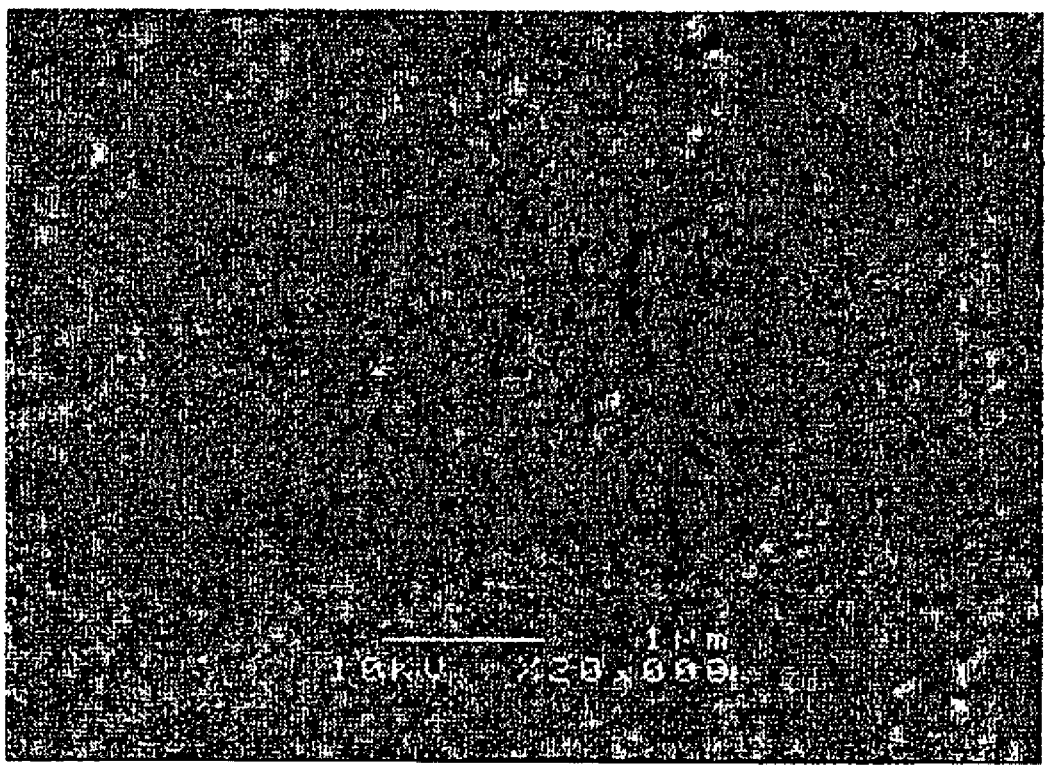
Figure 16:
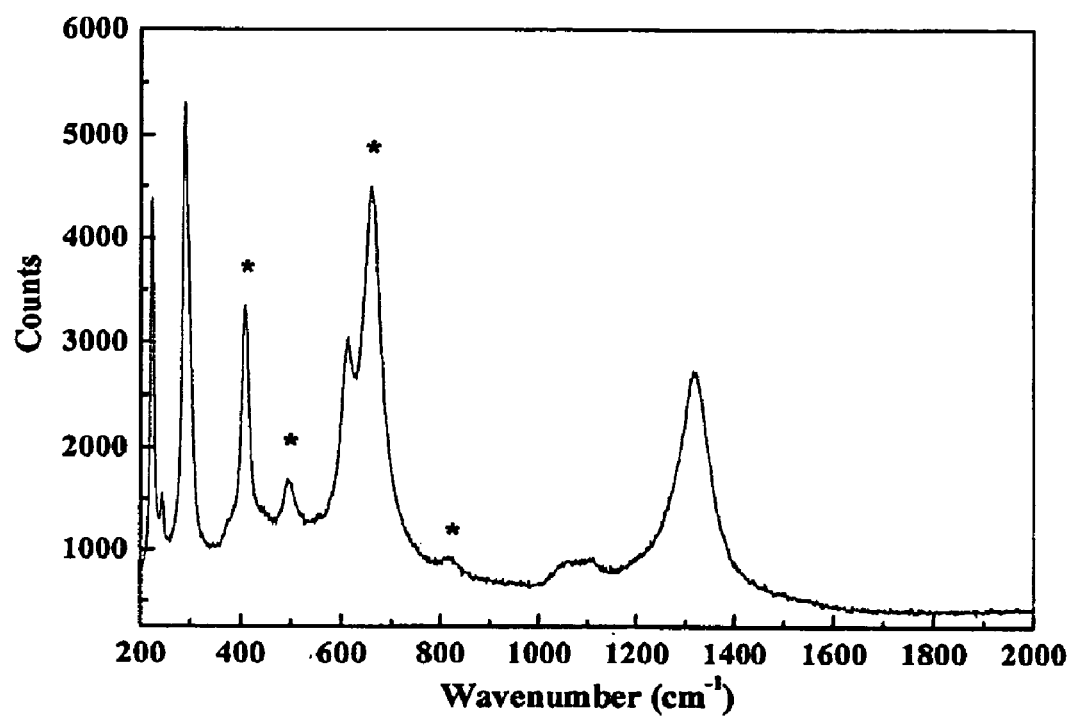
FIG. 16 is the Raman spectrum of titanium dioxide coating stainless steel samples by scratch-proof method. The symbols of "*" in the picture indicate the characteristic peak of anatase.

FIG. 15 is a titanium dioxide-coated plate prepared by method illustrated in Example 15. The SEM pictures show the coating at increasing magnification. It is clear from FIG. 15a that a uniform coating was obtained. FIG. 15b shows that most of the titanium dioxide are deposited along the texture of the substrate. The coating is less than ten monolayers of nanosized titanium dioxide. Micro-Raman spectroscopy (FIG. 16) indicates anatase-titanium dioxide.

The coating is scratch-proof using nails, and can tolerate washing with sponge and normal dishwasher operation without delamination of titanium dioxide.

Figure 17:
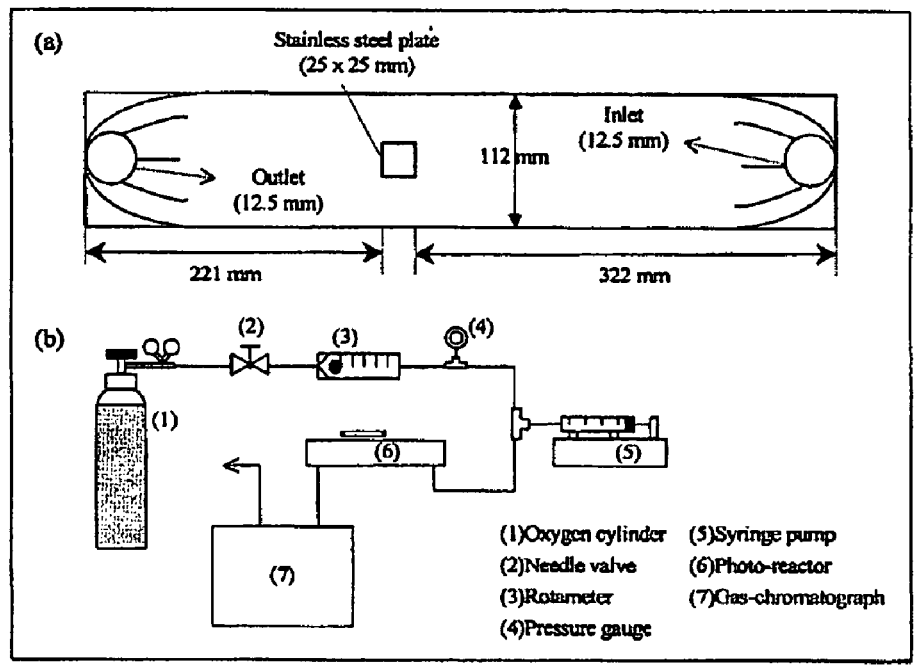
FIG. 17 is a schematic diagram of the photoreactor and test setup.

(3) Titanium Dioxide Coating Performance (a) Photocatalytic Oxidation Reaction of Titanium Dioxide-Coated Sample (No. 10, Example 15) in Flow Reactor 1) As shown in FIG. 17, the flat, rectangular photo-reactor had dimensions of 578 mm×113 mm. The stainless steel reactor contained the inlet and outlet ports, a recess for the catalyst plate and two sets of machined baffles.
2) A 6.25 mm thick Pyrex glass cover completes the reactor assembly. The Pyrex glass window and the stainless steel reactor form a narrow rectangular channel (2 mm deep× 112 mm wide) for gas flow.
3) Liquid VOC was delivered to a constant temperature heat exchanger using a syringe pump (kdScientific 1000) and mixed with synthetic air before entering the reactor.
4) The titanium dioxide-coated plate (2.5 cm×2.5 cm, catalyst loading is around 0.001 g) located 322 mm downstream from the gas entrance.
5) In a typical experiment, a metered amount of the VOC vapor (0.01 ml/h) was mixed with pure synthetic air with flow rate at 200 ml/min before entering the reactor. During the reaction, the humidity was controlled at 60±2%.
6) After the feed concentration was attained equilibrium, the titanium dioxide coated plate was illuminated by five fluorescent black lamps (365 nm) located 7 mm above reactor's window.
7) The outlet gases were separated using a HP-Ultra-1 capillary column and analyzed using a gas chromatograph (HP 6890) equipped with thermal conductivity and flame ionization detectors. The gases used in the GC were helium (UHP, CW), hydrogen (UHP, HKO) and synthetic air (HP, HKSP).

(b) Photocatalytic Oxidation Reaction of Titanium Dioxide-Coated Sample (No. 10, Example 15) in Prototype PCO-Air Purifier 150, Chiaphua Industries Limited (Hong Kong)

Figure 18:
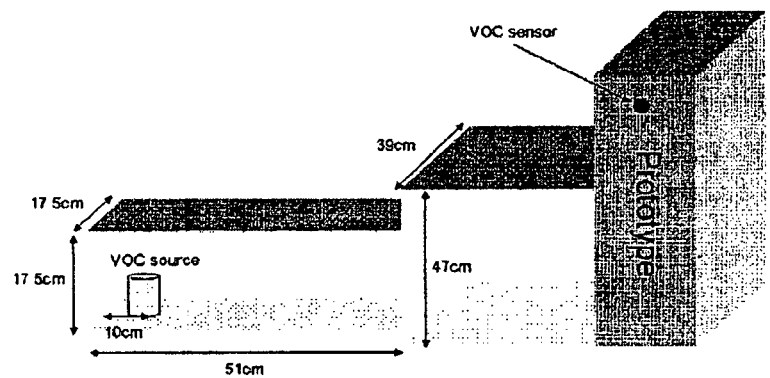
FIG. 18 is a schematic diagram of duct system used for VOC testing.
Figure 19A:
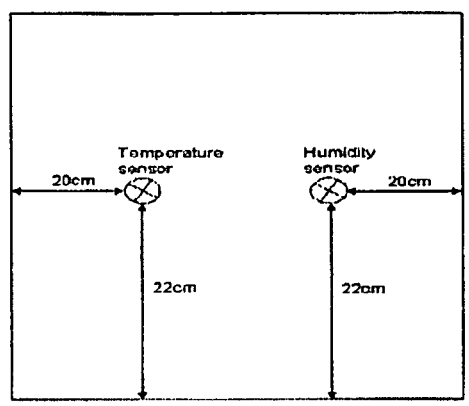
FIG. 19A and 19B are locations of the humidity and temperature sensors at the (a) air inlet and (b) air outlet of the PCO Air Purifier Model 150.
Figure 19B:
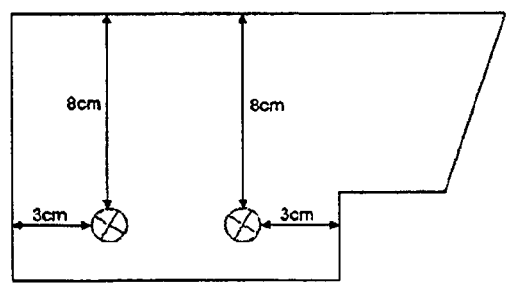

1) VOC Removal and Remediation was tested using ethanol under ambient temperature (20–30° C.) and humidity (60–80% RH).
2) Ethanol was evaporated, mixed with Air inside a duct before entering the inlet of the PCO Air Purifier Model 150 (Power for UV lamp: 8 W, Coating area: 110183 mm², flow rate: ~121 m³/hr) as shown in FIG. 18.
3) The sensors used for the tests are VOC gas sensor Model Type D1 (# TGS 2602) from FIGARO, humidity sensor Model Ceramic SIL (HIH-3605-A) from Honeywell and temperature sensor Model DZ Version (LM35 DZ) from National Semiconductor.
4) The VOC sensor was calibrated against Photoionization Gas Detector Model PGM-30 from RAE, and the humidity and temperature was calibrated using VelociCalc Plus Multi-Parameter Ventilation Model (8386-M-GB) from TSI Incorporated.
5) A Digital Multi-Gas Monitor (1302) from Bruel & Kjaeror records the outlet carbon dioxide level. Continuous transient measurements of VOC removal, temperature and humidity fluctuations and $CO_2$ generation were conducted with each experiment lasting 8 h.
6) A set of humidity and temperature sensors were placed on the air inlet and outlet area of the PCO Air Purifier Model 150. The precise location of the sensors at the air inlet and outlet are shown in FIGS. 19a & 19b, respectively.
7) Holes were drilled on the side of the PCO Air Purifier Model 150 and the VOC sensors were inserted and located near the air entrance and outlet to the PCO chamber. These locations provided the most stable VOC readings. These locations are shown in the schematic diagram in FIG. 20. A VOC sensor was also placed outside the PCO Air Purifier Model 150 to measure the ambient VOC level.
8) The ambient $CO_2$ level was measured by Digital Multi-Gas Monitor (1302) from Bruel & Kjaeror prior to the start of the VOC test. The inlet gas tube of the Digital Multi-Gas Monitor (1302) was then inserted in the air outlet of the PCO Air Purifier Model 150.
9) The transient data from the VOC, humidity and temperature sensors were collected by a PC using PICO software at 1-data point measurement per second.

(c) The Germicidal Proterties of the Titanium Dioxide Prepared by Example 2.

1) A Clinical tests was conducted using *Bacillus subtilis*, *Pseudomonas aeruginosa* and *Staphylococcus epidermidis*.
2) Tryptic soy agar (TSA, CM 131) from Oxoid was used as growth substrate.
3) Circular filter papers (5 mm diameter) were saturated with (1) distilled water (positive control), (2) bleach solution (negative control), (3) 75% alcohol and (4) different concentration of titanium dioxide were placed onto each bacterial samples and incubated at 37° C. for 24 h.

(d) The Germicidal Properties of Titanium Dioxide-coated Sample (No. 10, Example 15) in Prototype PCO-Air Purifier 150. Chiaphua Industries Limited (Hong Kong)

1) Bioaerosol Removal by PCO Air Purifier Model 150 was tested for the reduction of natural bioaerosol (i.e., bacteria and fungi) at the university canteen during peak lunch hours.
2) The site has an average bioaerosol loading of 800 colony forming units/m³. The common bacterial and fungi species found are *Micrococcus, Staphylococcus epidermis, Cladosporium, Penicillium* and *Yeas*.
3) An air channel was constructed and attached to the air outlet of PCO Air purifier Model 150 as shown in FIG. 21.
4) Two Bioaerosol Impactor (single-stage) with pump (Model 1631-107B-G557X) were used for the experiment TSA and MEA plates for sampling of airborne bacteria and fungi, respectively. One Bioaerosol impactor was located near the air inlet of PCO Air Purifier Model 150 (see lower dot in FIG. 21) and another at the exit of the air channel (see upper dot in FIG. 21).
5) The sampling of inlet and outlet air was conducted simultaneously at a sampling rate of 28.3 L/min for 10 minutes. Three sampling runs for bacteria and three sampling runs for fungi were conducted per test.

(1) VOC Performance Test in Flow Reactor

Figure 22:
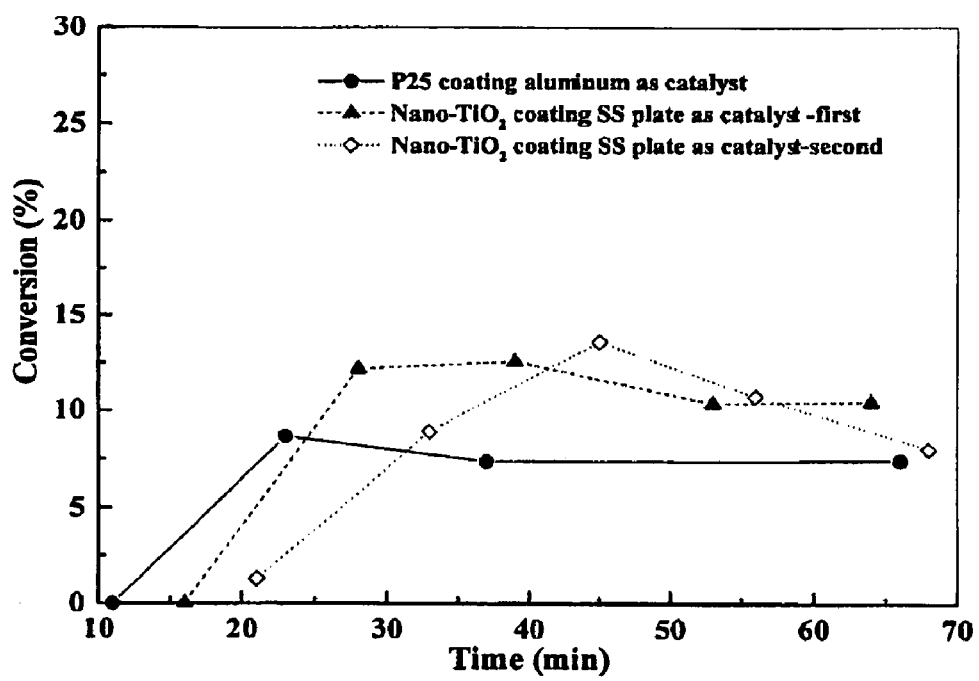
FIG. 22 is the isopropanol conversion profile as a function of UV illumination time. The feed concentration of isopropanol is 266 ppm.

The catalytic activity of the nanometer-sized titanium dioxide coated samples prepared according to Example 15 was investigated using gas-phase isopropanol as probe molecules. FIG. 22 shows the conversion of isopropanol as function of illumination time. It is seen that the coated catalyst attains its maximum conversion around 12–14% when it exposed to UV light for more than 40 min, and it was tested twice to confirm that the maximum conversion is similar.

After reaction test, the deactivated titanium dioxide coated sample prepared according to Example 15 could be regenerated by water washing and followed calcined at 450° C.

(2) VOC Performance Test in a Prototype

Table 4 shows the prototype VOC degradation performance data. It confirms that the incorporated titanium dioxide coated plate prepared by Example 15 has ability to degrade VOC under the real indoor operating condition.

TABLE 4

VOC degradation performance data

| Performance test type | With UV illumination |
|---|---|
| Average removed ethanol (mmol/h) | 23.15 |
| Average increased $CO_2$ (mmol/h) | 37.77 |

(3) The Germicidal Effect

Figure 23:
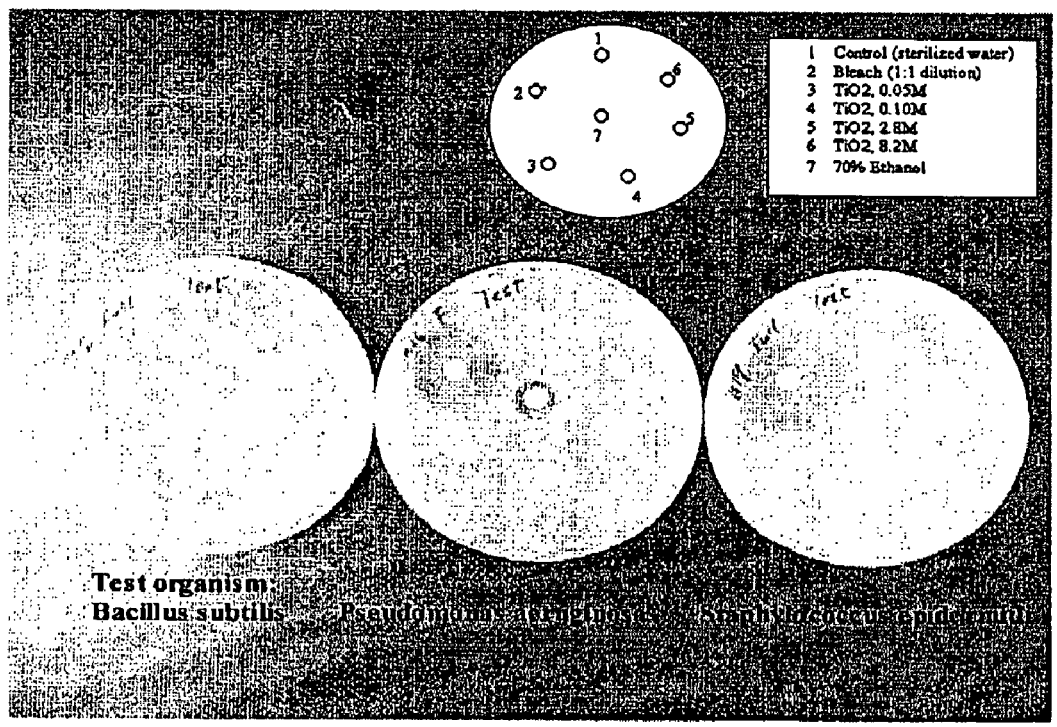
FIG. 23 is clinical tests of the germicidal properties of Nano-titanium dioxide of different concentration for *Bacillus subtilis, Pseudomonas aeruginosa* and *Staphylococcus epidermidis*.

The Clinical tests results for *Bacillus subtilis, Pseudomonas aeruginosa* and *Staphylococcus epidermidis* are shown in FIG. 23. The circular filter papers (5 mm diameter) were saturated with (1) distilled water (positive control), (2) bleach solution (negative control), (3) 75% alcohol and (4) different concentration of titanium dioxide. The titanium dioxide at coating concentration has similar germicidal effectiveness as 75% alcohol even without UV-irradiation.

The titanium dioxide coated plate prepared by Example 15 was incorporated in the prototype and its germicidal performance was examined in the public canteen, the results in Table 5 shows that it can reduce about 36% bacteria and 60% fungi, respectively. In addition, the coating sample is capable of destroying of bacteria and fungi in the absence of UV illumination, reinforcing the germicidal effectiveness of titanium dioxide material prepared by present invention under the non-UV condition as shown above.

TABLE 5

Germicidal performance data

| Performance test type | With UV illumination | Without UV illumination |
|---|---|---|
| Bacteria average reduction (%) | 35.98 | 28.76 |
| Fungi average reduction (%) | 59.62 | 26.76 |

While the present invention has been described with specific embodiments, it should be understood by those skilled in the art that various changes may be made and equivalents may be substituted without departing from the true spirit and scope of the invention.

What is claimed is:

1. A photocatalytic oxidation material comprising:
   a) 40±10% w/w titanium dioxide crystals having crystal size of 3 nm–25 nm and crystallinity greater than 70%;
   b) at least 50% w/w polyethylene glycol as a dispersant, said dispersant interacting with the titanium dioxide crystals to prevent aggregation thereof such that the crystal size is maintained at 3–25 nm; and
   c) 1–10% w/w water,
wherein the photocatalytic oxidation material is prepared by a microwave treatment of a mixture of titanium dioxide sol and polyethylene glycol and further comprises surface hydroxyl groups on said titanium dioxide, and wherein 90%–100% of said surface hydroxyl groups are characterized by at least one absorption peak within an infrared spectrum range between 3610–3680 $cm^{-1}$ when recorded at 150° C.

2. The material according to claim 1, wherein the crystal size of the titanium dioxide crystals remains within the 3–25 nm range for at least one year.

3. The material according to claim 2, wherein at least 80% of the titanium dioxide crystals have a crystal size within the range of 3–25 nm and with no more than 2 nm in size variation.

4. The material according to claim 2, wherein the surface area of the titanium dioxide crystals is larger than 50 $m^2/g$ and at least 70% of the titanium dioxide crystal is anatase.

5. The material according to claim 2, wherein the dispersant is a polymer containing OH group or oxygenated function group, said oxygenated function group being selected from a group consisting of hydroxyl, carboxyl and ketone.

6. The material according to claim 1, wherein the 90–100% of the surface hydroxyl groups are characterized by one absorption peak at about 3660±20 $cm^{-1}$ and another absorption peak at about 3630±20 $cm^{-1}$ in an infrared spectrum when recorded at 150° C.

7. The material according to claim 1, wherein the polyethylene glycol has a molecular weight at 200–1000 g/mole.

8. The material according to claim 1, wherein said titanium dioxide crystals having crystal size from 3.29 nm to 7.5 nm.

9. The material according to claim 1, further comprising gold.

10. The material according to claim 1, further comprising nitric acid.

11. The material according to claim 10, wherein the nitric acid is of 5.9% w/w.

12. The process of producing a titanium dioxide photocatalytic oxidation material, comprising:
   a) forming a titanium dioxide sol with titanium dioxide crystals having crystal size of 3 nm–25 nm and crystallinity greater than 70%;
   b) adding polyethylene glycol as a dispersant to said titanium dioxide sol to form a mixture having a titanium dioxide: dispersant ratio of 2:5 to 7:10;
   c) applying microwave treatment on the mixture to crystallize and grow titanium dioxide crystals; and
   d) reducing the water content of the mixture to less than 10% w/w while maintaining the crystal size of said titanium dioxide crystals in the 3–25 nm range.

13. The process according to claim 12, wherein the titanium dioxide sol is prepared by hydrolyzing a titanium dioxide precursor in the presence of alcohol and water and peptizing using nitric acid.

14. The process according to claim 12, wherein the dispersant is a polymer containing OH group or oxygenated function group, said oxygenated function group being selected from a group consisting of hydroxyl, carboxyl and ketone.

15. The process according to claim 12, wherein the dispersant is polyethylene glycol.

16. The process according to claim 15, wherein the polyethylene glycol has a molecular weight at 200–1000 g/mole.

17. The process according to claim 12, further comprising controlling the crystal size of the titanium dioxide crystals such that at least 80% of the titanium dioxide crystals have a crystal size within the range of 3–25 nm and with no more than 2 nm in size variation.

18. The process according to claim 12, wherein the microwave treatment lasts about 10–30 minutes at a power ranging from 30 W to 200 W.

19. A coating process for coating a photocatalytic oxidation materials comprising
   a) applying 1–10 g of a photocatalytic oxidation material onto each square meter of a substrate, wherein the photocatalytic oxidation material comprises (1) 40±10% w/w titanium dioxide crystals having crystal size of 3 nm–25 nm and crystallinity greater than 70%, (2) at least 50% w/w polyethylene glycol as a dispersant interacting with the titanium dioxide crystals to prevent aggregation thereof such that the crystal size is maintained at 3–25 nm, and (3) 1–10% w/w water, wherein the photocatalytic oxidation material is prepared by a microwave treatment of a mixture of titanium dioxide sol and polyethylene glycol and further comprises surface hydroxyl groups on said titanium dioxide, and wherein 90%–100% of said surface hydroxyl groups are characterized by at least one absorption peak within an infrared spectrum range between 3610–3680 $cm^{-1}$ when recorded at 150° C.;
   b) spreading said material evenly on said substrate to form a coated substrate; and
   c) calcining the coated substrate.

20. The coating process according to claim 19, wherein 90–100% of the surface hydroxyl groups are characterized by one absorption peak at about 3660±20 $cm^{-1}$ and another absorption peak at about 3630±20 $cm^{-1}$ in an infrared spectrum when recorded at 150° C.

21. The coating process according to claim 19, wherein step (b) is performed by using a brush.

22. A self-cleaning photocatalytic oxidation coating made by the coating process of claim 19.

23. A self-cleaning photocatalytic oxidation material comprising a solid surface having one to ten monolayers of titanium dioxide coated thereon, said titanium dioxide coating comprising titanium dioxide crystals having crystal size of about 3–25 nm and crystallinity of 70–100%, wherein the titanium dioxide crystals comprise surface hydroxyl groups thereon, wherein 90%–100% of said surface hydroxyl groups are characterized by at least one absorption peak within an infrared spectrum range between 3610–3680 $cm^{-1}$ when recorded at 150° C.

24. The self-cleaning photocatalytic oxidation material according to claim 23, wherein the crystal size of the titanium dioxide crystals remains within the 3–25 nm range for at least one year.

25. The self-cleaning photocatalytic oxidation material according to claim 23, wherein the 90–100% of the surface hydroxyl groups are characterized by one absorption peak at about 3660±20 $cm^{-1}$ and another absorption peak at about 3630±20 $cm^{-1}$ in an infrared spectrum when recorded at 150° C.

* * * * *

UNITED STATES PATENT AND TRADEMARK OFFICE
CERTIFICATE OF CORRECTION

PATENT NO. : 7,144,840 B2  
APPLICATION NO. : 10/898118  
DATED : December 5, 2006  
INVENTOR(S) : King Lun Yeung and Nan Yao It is certified that error appears in the above-identified patent and that said Letters Patent is hereby corrected as shown below:

In column 5, line 56, replace reference letter "1" with --D--

In column 8, line 43, after "PEG", add punctuation --.--

In column 10, line 24, replace "40wt %" with --40 wt%--

In column 14, line 45, after 54°, replace punctuation "," with punctuation --.--

In column 18, line 20, replace "Proterties" with --Properties--

Signed and Sealed this

Eighth Day of May, 2007

JON W. DUDAS  
*Director of the United States Patent and Trademark Office*